United States Patent
Rhyne

(10) Patent No.: US 12,116,926 B2
(45) Date of Patent: Oct. 15, 2024

(54) INTEGRATED SYSTEM FOR CONVERTING NUCLEAR ENERGY INTO ELECTRICAL, MECHANICAL, AND THERMAL ENERGY

(71) Applicant: NuGen, LLC, Charlotte, NC (US)

(72) Inventor: Stephen K. Rhyne, Charlotte, NC (US)

(73) Assignee: NUGEN, LLC, Charlotte, NC (US)

( * ) Notice: Subject to any disclaimer, the term of this patent is extended or adjusted under 35 U.S.C. 154(b) by 0 days.

(21) Appl. No.: 18/481,628

(22) Filed: Oct. 5, 2023

(65) Prior Publication Data

US 2024/0183307 A1    Jun. 6, 2024

Related U.S. Application Data

(63) Continuation of application No. 17/862,502, filed on Jul. 12, 2022, now Pat. No. 11,815,013, which is a continuation of application No. 17/323,510, filed on May 18, 2021, now Pat. No. 11,421,589.

(51) Int. Cl.
| | |
|---|---|
| *F02C 1/05* | (2006.01) |
| *F02C 1/04* | (2006.01) |
| *F02C 1/10* | (2006.01) |
| *F02C 3/16* | (2006.01) |

(52) U.S. Cl.
CPC .................. *F02C 1/05* (2013.01); *F02C 1/04* (2013.01); *F02C 1/10* (2013.01); *F02C 3/165* (2013.01)

(58) Field of Classification Search
CPC ...... F02C 1/04; F02C 1/05; F02C 1/10; F02C 3/165
See application file for complete search history.

(56) References Cited

U.S. PATENT DOCUMENTS

| | | | |
|---|---|---|---|
| 3,038,308 | A | 6/1962 | Fuller et al. |
| 3,122,882 | A | 3/1964 | Schultz et al. |
| 3,210,254 | A | 10/1965 | Fortescue |
| 3,336,207 | A | 8/1967 | Peterson |
| 3,897,838 | A | 8/1975 | Hosegood |
| 4,144,723 | A | 3/1979 | Morse et al. |
| 4,257,846 | A | 3/1981 | Pierce |
| 5,255,509 | A | 10/1993 | Powell et al. |
| 5,309,492 | A | 5/1994 | Adams |
| 6,071,482 | A | 6/2000 | Broeckerhoff et al. |

(Continued)

FOREIGN PATENT DOCUMENTS

| | | |
|---|---|---|
| MX | 9102571 A | 7/1993 |
| MX | 197187 B | 3/2000 |
| PH | 1/2014/000128 A | 11/2015 |

OTHER PUBLICATIONS

Advertisement—The Closed-Cycle Gas-Cooled Reactor . . . A Progress Report From Ford Instrument, Scientific American, Inc. (1956) 1 Page.

(Continued)

*Primary Examiner* — Steven M Sutherland
(74) *Attorney, Agent, or Firm* — Alston & Bird LLP

(57) ABSTRACT

Provided is an apparatus for generating electricity comprising a gas propellant chamber and one or more generators. The gas propellant chamber comprises a compressor, a nuclear fuel chamber, and a turbine assembly, wherein a drive shaft extending axially through the gas propellant chamber couples the compressor to the turbine assembly and wherein the nuclear fuel chamber is a rotating nuclear fuel chamber configured to rotate axially along the drive shaft to which the compressor and the turbine assembly are coupled.

20 Claims, 12 Drawing Sheets

(56) References Cited

U.S. PATENT DOCUMENTS

| | | |
|---|---|---|
| 6,707,871 B1 | 3/2004 | Thomson |
| 6,877,309 B1 | 4/2005 | Rhyne |
| 7,073,319 B1 | 7/2006 | Rhyne |
| 8,170,173 B2 | 5/2012 | Reyes et al. |
| 8,437,446 B2 | 5/2013 | Young et al. |
| 8,472,581 B2 | 6/2013 | Young |
| 8,542,792 B1 | 9/2013 | Young et al. |
| 8,588,360 B2 | 11/2013 | Reyes et al. |
| 8,687,759 B2 | 4/2014 | Reyes et al. |
| 8,731,130 B2 | 5/2014 | Reyes et al. |
| 8,744,035 B1 | 6/2014 | Young et al. |
| 8,752,510 B2 | 6/2014 | Williams et al. |
| 8,824,619 B2 | 9/2014 | Young et al. |
| 8,848,855 B2 | 9/2014 | Nylander et al. |
| 8,867,689 B2 | 10/2014 | Houghton et al. |
| 8,891,723 B2 | 11/2014 | Reyes et al. |
| 9,132,619 B2 | 9/2015 | Khalifa et al. |
| 9,188,328 B2 | 11/2015 | Williams et al. |
| 9,230,697 B2 | 1/2016 | Groome et al. |
| 9,305,671 B2 | 4/2016 | Hough |
| 9,330,796 B2 | 5/2016 | Reyes et al. |
| 9,403,205 B2 | 8/2016 | Williams et al. |
| 9,406,409 B2 | 8/2016 | Reyes et al. |
| 9,431,136 B2 | 8/2016 | Reyes et al. |
| 9,588,082 B2 | 3/2017 | Pollock et al. |
| 9,697,917 B2 | 7/2017 | Snuggerud |
| 9,721,682 B2 | 8/2017 | Young et al. |
| 9,767,926 B2 | 9/2017 | Schleicher et al. |
| 9,866,063 B2 | 1/2018 | Hough |
| 9,870,838 B2 | 1/2018 | Reyes et al. |
| 9,881,703 B2 | 1/2018 | Liszkai et al. |
| 9,881,704 B2 | 1/2018 | Harris |
| 9,897,234 B2 | 2/2018 | Koski et al. |
| 9,897,308 B2 | 2/2018 | Lobscheid |
| 9,945,704 B2 | 4/2018 | Galvez |
| 9,984,777 B2 | 5/2018 | Reyes et al. |
| 9,997,262 B2 | 6/2018 | Liszkai et al. |
| 10,147,507 B2 | 12/2018 | Groome et al. |
| 10,186,334 B2 | 1/2019 | Reyes et al. |
| 10,191,464 B2 | 1/2019 | Snuggerud et al. |
| 10,229,757 B2 | 3/2019 | Filippone et al. |
| 10,269,460 B2 | 4/2019 | Butchart |
| 10,304,570 B2 | 5/2019 | Cadell et al. |
| 10,304,575 B2 | 5/2019 | Hough et al. |
| 10,319,484 B1 | 6/2019 | Reyes, Jr. |
| 10,333,342 B2 | 6/2019 | Hough |
| 10,354,762 B2 | 7/2019 | Keller et al. |
| 10,685,755 B2 | 6/2020 | Rhyne et al. |
| 10,685,756 B2 | 6/2020 | Rhyne et al. |
| 10,685,757 B2 | 6/2020 | Katalenich et al. |
| 10,755,826 B2 | 8/2020 | Rhyne et al. |
| 10,784,006 B2 | 9/2020 | Rhyne et al. |
| 2001/0052704 A1 | 12/2001 | Bosley et al. |
| 2011/0116591 A1 | 5/2011 | Nishiguchi |
| 2013/0133325 A1 | 5/2013 | Mccall |
| 2013/0154269 A1 | 6/2013 | Baldwin |
| 2013/0266363 A1 | 10/2013 | Khalifa et al. |
| 2015/0187447 A1 | 7/2015 | Liszkai |
| 2015/0332794 A1 | 11/2015 | Nguyen |
| 2016/0049210 A1 | 2/2016 | Filippone et al. |
| 2016/0055927 A1 | 2/2016 | Mirsky et al. |
| 2016/0180975 A1 | 6/2016 | Morrill et al. |
| 2016/0189811 A1 | 6/2016 | Pottorf et al. |
| 2016/0232996 A1 | 8/2016 | Liszkai |
| 2016/0232998 A1 | 8/2016 | Reyes et al. |
| 2016/0276046 A1 | 9/2016 | Liszkai et al. |
| 2016/0303694 A1 | 10/2016 | Williams et al. |
| 2016/0341120 A1 | 11/2016 | Simpkin et al. |
| 2017/0045869 A1 | 2/2017 | Buenaventura et al. |
| 2017/0159867 A1 | 6/2017 | Lynch et al. |
| 2017/0178756 A1 | 6/2017 | Ingersoll et al. |
| 2017/0178757 A1 | 6/2017 | Hough et al. |
| 2017/0213608 A1 | 7/2017 | Keller et al. |
| 2017/0222506 A1 | 8/2017 | Silke et al. |
| 2017/0243662 A1 | 8/2017 | Schleicher et al. |
| 2017/0263344 A1 | 9/2017 | Snuggerud |
| 2017/0271934 A1 | 9/2017 | Creedon et al. |
| 2017/0301422 A1 | 10/2017 | Kitto et al. |
| 2017/0310116 A1 | 10/2017 | Wike et al. |
| 2018/0090237 A1 | 3/2018 | Filippone |
| 2018/0151262 A1 | 5/2018 | Reyes et al. |
| 2018/0186545 A1 | 7/2018 | Zocher |
| 2018/0190392 A1 | 7/2018 | Lobscheid |
| 2018/0190393 A1 | 7/2018 | Snuggerud |
| 2018/0190395 A1 | 7/2018 | Clarkson et al. |
| 2018/0190397 A1 | 7/2018 | Noel |
| 2018/0190402 A1 | 7/2018 | Shaw et al. |
| 2018/0226162 A1 | 8/2018 | Liszkai et al. |
| 2018/0252561 A1 | 9/2018 | Galvez |
| 2018/0261343 A1 | 9/2018 | Reyes et al. |
| 2018/0286528 A1 | 10/2018 | Katalenich et al. |
| 2018/0330833 A1 | 11/2018 | Liszkai |
| 2019/0148027 A1 | 5/2019 | Rhyne et al. |
| 2019/0206579 A1 | 7/2019 | Liszkai |
| 2019/0293117 A1 | 9/2019 | Ertas et al. |
| 2021/0110946 A1 | 4/2021 | Rhyne et al. |
| 2021/0166825 A1 | 6/2021 | Sheeder et al. |
| 2022/0130558 A1 | 4/2022 | Zhang et al. |
| 2023/0047197 A1 | 2/2023 | Zhang et al. |

OTHER PUBLICATIONS

Dan Yurman, "Mini Reactors Are Going Places and Pack a Lot of Power," [online] [retrieved on Aug. 16, 2019] retrieved from the Internet <https://www.energycentral.com/c/ec/mini-reactors-are-going-places-and-pack-lot-power>, dated Aug. 6, 2019, 19 pages.

English abstract only of MX Application No. MX Appln 99010848 filed Jul. 16, 2004.

EPO, ISA/220 International Search Report and Written Opinion for PCT/US2022/028312 (ISA/EP) mailed Jan. 26, 2023 (11 pages).

Filippone, C. et al., The Holos Reactor: A Distributable Power Generator With Transportable Subcritical Power Modules, The Holos Reactor (dated Jun. 25, 2017) 49 pages.

General Atomics, Status Report—EM2, USA, Sep. 30, 2019 (30 pages).

http://stateoftheartnovelinflowtech.blogspot.com, retrieved from internet Jun. 26, 2020.

https://www.youtube.com/watch?v=OcPo9Lf 44 TE, retrieved from internet Jun. 26, 2020.

https://padlet.com/gearturbine/un2slbar3s94, retrieved from internet Jun. 26, 2020.

https://www.behance.net/gallery /21691891/Imploturbocompressor, retrieved from internet Jun. 26, 2020.

https://www.behance.net/gallery/21019191/Novel-Rotary-Turbo-InFlow-Tech-Gearturbine-Proiect, retrieved from internet Jun. 26, 2020.

Innovative closed cycle gas cooled reactor-circa Apr. 1956—Atomic Insights [retrieved Jan. 26, 2018). Retrieved from the Internet: URL: https://atomicinsights.com/innovative-closed-cycle-gas-cooled-reactor-circa-Apr. 1956/. dated Jan. 3, 2016) 13 pages.

International Search Report and Written Opinion for Application No. PCT/IB2018/058086 dated May 30, 2019.

Jo, C. K. et al., Preliminary Core Analysis of a Micro Modular Reactor, Transactions on the Korean Nuclear Society Spring Meeting, May 29-30, 2014, 4 pages.

ML-1—Wikipedia [online] [retrieved Nov. 10, 2017]. Retrieved from the Internet: <URL: https://en.wikipedia.org/wiki/ML-1?domain=en.wikipedia.org>. (dated Nov. 20, 2015) 3 pages.

ML-1 Mobile Power System: Reactor in a Box—Atomic Insights, [online] [retrieved Jan. 26, 2018]. Retrieved from the Internet: <URL: https://atomicinsights.com/ml1-mobile-power-system-reactor-box/>. (dated Nov. 1, 1995) 4 pages.

Orbiting Combustor Nozzle Jet Engine [online] [retrieved Nov. 10, 2017]. Retrieved from the Internet: <URL: https://www.secretprojects.co.uk/forum/index.php?topic=10967.0>. (dated Sep. 4, 2010) 4 pages.

Steele, Jim 'Bubble-through' nuclear engine might be a future NASA workhorse, NEWS, Mar. 8, 2022 (5 pages) [retrieved from

(56) References Cited

OTHER PUBLICATIONS

Internet Mar. 16, 2022] https://www.uah.edu/news/items/bubble-through-nuclear-engine-might-be-a-future-nasa-workhorse.
Suid, L. H., The Army's Nuclear Power Program, The Evolution of a Support Agency (1990) 89-93.
The Wayback Machine: The NuGen Engine,, May 9, 2021, https://web.archive.org/web/20210509225339/http://www.nucdev.com/the-nugen-engine-.html.
U.S. Dept of Energy, Nuclear Technologies and Materials Advance Reactor Concepts-20, Fast Modular Reactor Principal Design Criteria, 30599TG00005 Revision 2 PD-06, General Atomics, Dec. 22, 2022 (44 pages).
Very Small Modular Nuclear Fission Reactors for Military and Space Applications [online] [retrieved Nov. 10, 2017]. Retrieved from the Internet :<URL: https://www.nextbrigfuture.com/2017/07/very-small-modular-nuclear-fission-reactors-for-. . . >. (dated Jul. 11, 2017) 13 pages.
What Will Advanced Nuclear Power Plants Cost?, Energy Innovation Reform Project (undated) 43 pages.
Zhao, J-C., Safe and Secure Micro Modular Reactors, ARPA-E Safe and Secure Megawatt-Size Nuclear Power Workshop, Mar. 16-17, 2016, 23 pages.
U.S. Appl. No. 17/682,502, filed Jul. 12, 2022, U.S. Pat. No. 11,815,013, Issued.
U.S. Appl. No. 17/323,510, filed May 18, 2021, U.S. Pat. No. 11,421,589, Issued.

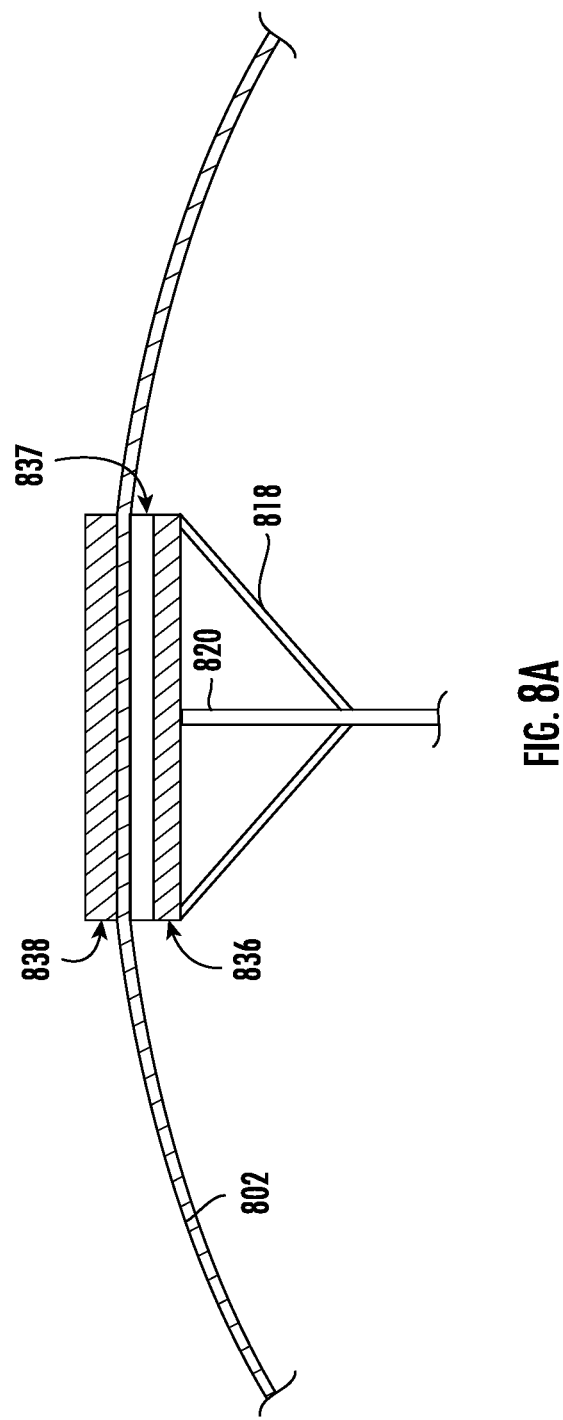

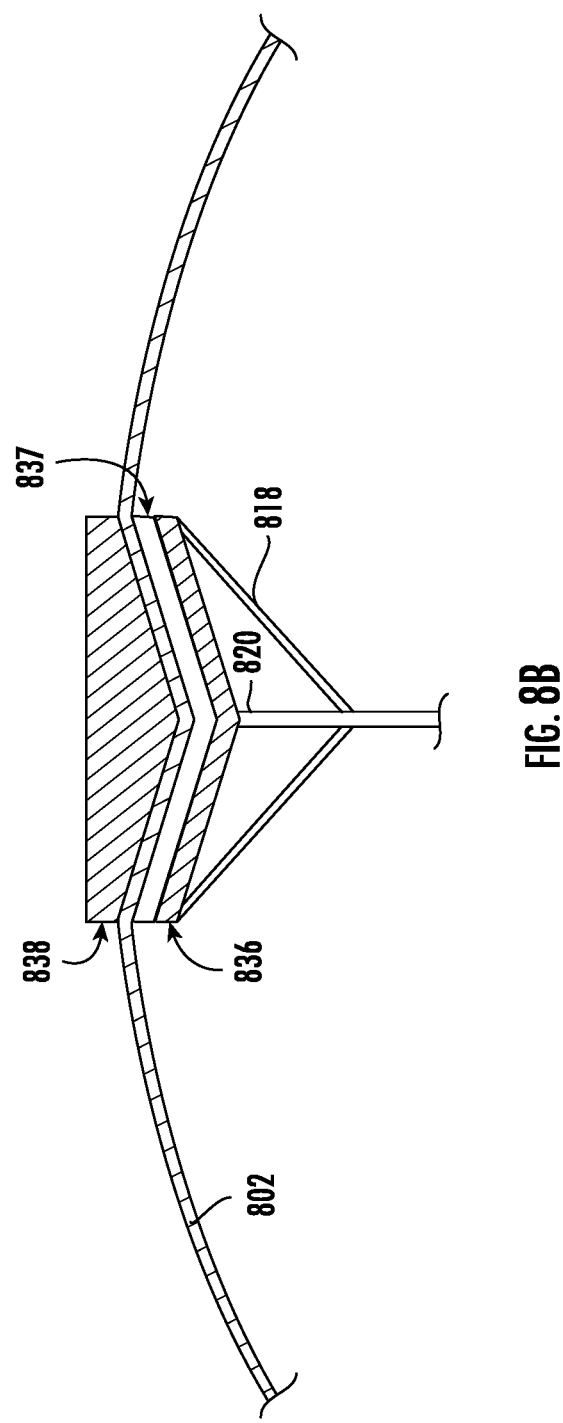

INTEGRATED SYSTEM FOR CONVERTING NUCLEAR ENERGY INTO ELECTRICAL, MECHANICAL, AND THERMAL ENERGY

CROSS-REFERENCE TO RELATED APPLICATION(S)

This application is a continuation of U.S. patent application Ser. No. 17/862,502 filed Jul. 12, 2022, which is a continuation of U.S. patent application Ser. No. 17/323,510, filed May 18, 2021, now U.S. Pat. No. 11,421,589, each of which is incorporated by reference herein in its entirety.

BACKGROUND

For over fifty years, electricity from nuclear energy has been generated by large-scale power plants utilizing nuclear reactors as the energy source to heat coolant in the reactor that, directly or indirectly, drives a turbine that generates electricity. Such power generation systems typically use the conversion of nuclear energy to thermal energy to generate electricity. Fuel assemblies containing fissile material are placed within the reactor core and coolant flows through the reactor core, where the heat generated by the individual fuel assemblies is transferred to the coolant. In one common commercial power generation system—known as a pressurized water reactor system—the nuclear-heated primary coolant is directed through at least one heat transfer apparatus (e.g., a heat exchanger, steam generator and piping) in which the thermal energy of the heated coolant is transferred to a secondary coolant which is then used to drive the turbine while the reactor coolant, now cooled, is pumped back to the reactor core in a closed loop coolant system.

Applicant has identified a number of deficiencies and problems associated with conventional nuclear power generating systems. Through applied effort, ingenuity, and innovation, many of these identified problems have been solved by developing solutions that are included in embodiments of the present disclosure, many examples of which are described in detail herein.

BRIEF SUMMARY

In general, embodiments of the present disclosure provided herein include methods and systems for nuclear power generation, particularly nuclear power generation using a gas propellant for the energy conversion.

Embodiments of this disclosure could be deployed in various physical circumstances (on-grid; off-grid, including in remote locations; and in space). Embodiments of this disclosure could also be used for a variety of applications, including baseload electricity production, electricity to meet peaking power demand, off-grid electricity to secure installations, desalination; heat process production for industrial, refining and mining; and mechanical energy for various current and future devices, vehicles, and ships.

In accordance with one exemplary embodiment of the present disclosure, an apparatus for generating electricity comprises a gas propellant chamber comprised of an annular body defining first and second ends, the first end of the annular body defining an inlet assembly that is configured to draw operating gas into the gas propellant chamber and the second end defining an exhaust assembly that is configured to expel operating gas from the gas propellant chamber, the gas propellant chamber comprising a compressor positioned proximate the first end of the gas propellant chamber, a turbine assembly positioned proximate the second end of the gas propellant chamber, and a nuclear fuel chamber positioned within the annular body of the gas propellant chamber between the compressor and turbine assembly, wherein a drive shaft extending axially through the gas propellant chamber between the first and second ends couples at least the compressor to the turbine assembly; a containment vessel, wherein the gas propellant chamber is disposed within the containment vessel; and a rotor/stator assembly partially integrated within the containment vessel such that a rotor is disposed internally of the containment vessel, the rotor being in communication with a stator disposed externally of the containment vessel, and the rotor configured to rotate, thereby generating electricity.

In certain embodiments, the rotor is coupled to the compressor and turbine assembly via the drive shaft.

In some embodiments, the containment vessel comprises an outer wall housing the apparatus. In some further embodiments, a portion of an inner surface of the outer wall of the containment vessel adjoining the rotor is recessed to allow at least a portion of the rotor to be recessed within the outer wall of the containment vessel. In still further embodiments, the rotor is at least partially surrounded by a reinforced lip incorporated in the outer wall of the containment vessel.

In some embodiments, the rotor/stator assembly is disposed upstream of the compressor at a first end of the containment vessel proximate the first end of the gas propellant chamber. In some further embodiments, the rotor of the rotor/stator assembly is coupled to shielding, the shielding comprising one or more fins, the one or more fins configured to assist in directing the operating gas toward the inlet assembly.

In certain embodiments, the rotor/stator assembly is disposed downstream of the turbine assembly at a second end of the containment vessel proximate the second end of the gas propellant chamber.

In some embodiments, the exhaust assembly comprises a nozzle and the turbine assembly comprises at least one blade array in line with an exit of the nozzle.

In some embodiments, the turbine assembly comprises an expanding corkscrew-type turbine blade, the expanding corkscrew-type turbine blade configured such that the expanding corkscrew-type turbine blade rotates during operation of the turbine assembly. In some further embodiments, the expanding corkscrew-type turbine blade is coupled to the rotor. In still further embodiments, the rotor/stator assembly further comprises radioactive shielding and the expanding corkscrew-type turbine blade is coupled to the radioactive shielding, the radioactive shielding being coupled to the rotor.

In some embodiments, the drive shaft further extends to a first end of the containment vessel, the first end proximate the inlet assembly. In some further embodiments, the drive shaft extends the entire length of the containment vessel.

In certain embodiments, the nuclear fuel chamber is structured to cause the operating gas to flow in a spiral flow pattern in the nuclear fuel chamber and as the operating gas exits the nuclear fuel chamber. In some further embodiments, the annular body of the gas propellant chamber defines a region between the gas propellant chamber and the nuclear fuel chamber, the region forming an interior bypass for a portion of the operating gas to pass around the nuclear fuel chamber. In still further embodiments, the apparatus further comprises a circulation fan rotationally coupled to the compressor and the turbine assembly and disposed proximate to the compressor, wherein the circulation fan is configured to draw operating gas into the compressor and the interior bypass.

In some embodiments, the nuclear fuel chamber comprises a first end and a second end, the second end of the nuclear fuel chamber proximate the exhaust assembly and defined by a recessed indentation of the nuclear fuel chamber. In some further embodiments, the nuclear fuel chamber comprises a first end and a second end, the first end of the nuclear fuel chamber proximate the inlet assembly and defined by a recessed indentation of the nuclear fuel chamber.

In some embodiments, the containment vessel comprises an outer wall housing the apparatus and an inner wall, the inner wall defining an internal cavity enclosed within the containment vessel and annularly surrounding at least a portion of the annular body of the gas propellant chamber. In some further embodiments, the inner wall of the containment vessel defines a region between the inner wall of the containment vessel and the annular body of the gas propellant chamber, the region forming an exterior bypass for a portion of the operating gas to pass around the gas propellant chamber.

In some embodiments, one or more heat exchangers are disposed along the outer wall of the containment vessel.

In accordance with one exemplary embodiment of the present disclosure, an apparatus for generating electricity comprises a gas propellant chamber comprised of an annular body defining first and second ends, the first end of the annular body defining an inlet assembly that is configured to draw operating gas into the gas propellant chamber and the second end defining an exhaust assembly that is configured to expel operating gas from the gas propellant chamber, the gas propellant chamber comprising a compressor positioned proximate the first end of the gas propellant chamber, a turbine assembly positioned proximate the second end of the gas propellant chamber, and a nuclear fuel chamber positioned within the annular body of the gas propellant chamber between the compressor and turbine assembly, wherein a drive shaft extending axially through the gas propellant chamber between the first and second ends couples at least the compressor to the turbine assembly, wherein the drive shaft further extends to a first end of the containment vessel, the first end proximate the inlet assembly; a containment vessel, wherein the gas propellant chamber is disposed within the containment vessel; and a rotor/stator assembly wholly integrated within the containment vessel, the rotor/stator assembly comprising a rotor and a stator, the rotor connected to the drive shaft such that it is rotatably connected to the compressor and turbine assembly and the rotor configured to rotate, thereby generating electricity. In certain embodiments, the rotor is integrally formed with the drive shaft. In other embodiments, the rotor is fixedly coupled to the drive shaft.

In certain embodiments, the rotor/stator assembly is disposed upstream of the compressor. In certain further embodiments, the rotor/stator assembly is disposed proximate to an inner surface of the containment vessel.

In some embodiments, the rotor/stator assembly further comprises radioactive shielding, the radioactive shielding being coupled to the rotor. In some further embodiments, the shielding comprises one or more fins, the one or more fins facing the interior of the containment vessel and configured to assist in directing the operating gas toward the inlet assembly.

In some embodiments, the rotor is a circulation fan, the circulation fan disposed proximate to the compressor and configured to operate as the rotor. In certain embodiments, the rotor is a circulation fan, the circulation fan disposed proximate to the compressor at the first end of the gas propellant chamber and configured to operate as the rotor. In certain further embodiments, the stator is a stator belt disposed within engageable proximity of the circulation fan. In still further embodiments, the stator belt is connected to the exterior surface of the annular body of the gas propellant chamber proximate the first end of the gas propellant chamber such the stator belt annularly surrounds the circulation fan.

In some embodiments, the rotor/stator assembly is disposed downstream of the nuclear fuel chamber.

In certain embodiments, the turbine assembly comprises one or more blade assemblies, each blade assembly comprising one or more turbine blades and configured such that each of the one or more turbine blades rotates during operation of the turbine assembly. In some further embodiments, the exhaust assembly comprises a nozzle and at least one of the one or more blade assemblies of the turbine assembly is in line with an exit of the nozzle. In still further embodiments, the at least one of the one or more blade assemblies of the turbine assembly in line with the exit of the nozzle is the rotor. In still further embodiments, the rotor is in engageable proximity of the stator, the stator coupled to an exterior surface of the nozzle such that rotation of the blade assembly as the operating gas exits the nozzle generates electricity.

In some embodiments, the apparatus further comprises an ion thruster powered by the integrated rotor/stator assembly.

In accordance with one exemplary embodiment of the present disclosure, an apparatus for generating electricity comprises a gas propellant chamber comprised of an annular body defining first and second ends, the first end of the annular body defining an inlet assembly that is configured to draw operating gas into the gas propellant chamber and the second end defining an exhaust assembly that is configured to expel operating gas from the gas propellant chamber, the gas propellant chamber comprising a compressor positioned proximate the first end of the gas propellant chamber, a turbine assembly positioned proximate the second end of the gas propellant chamber, and a nuclear fuel chamber positioned within the annular body of the gas propellant chamber between the compressor and turbine assembly, wherein a drive shaft extending axially through the gas propellant chamber between the first and second ends couples at least the compressor to the turbine assembly; a containment vessel, wherein the gas propellant chamber is disposed within the containment vessel; and one or more generators disposed within the containment vessel, the one or more generators configured to generate electricity.

In some embodiments, a first generator of the one or more generators is disposed such that the first generator rotates along a different axis than the drive shaft extending through the gas propellant chamber. In some further embodiments, the first generator rotates along a perpendicular axis to the drive shaft. In still further embodiments, the drive shaft comprises a first gear box and the first generator is connected to the first gear box via a transmission shaft. In still further embodiments, the apparatus further comprises a circulation fan disposed proximate to the compressor, the circulation fan coupled to the drive shaft and configured to draw operating gas into the compressor. In certain further embodiments, the first gear box is connected to the drive shaft at a location upstream of the compressor and downstream of the circulation fan. In certain other embodiments, the first gear box is connected to the drive shaft at a location upstream of the circulation fan.

In some embodiments, an annular cavity is enclosed within the containment vessel, the annular cavity surrounding the gas propellant chamber and defined by an inner wall of the containment vessel. In some further embodiments, the first generator is disposed in the annular cavity. In still further embodiments, a seal is disposed at a junction of the transmission shaft through the inner wall of the containment vessel defining the annular cavity.

In accordance with one exemplary embodiment of the present disclosure, an apparatus for generating electricity comprises a gas propellant chamber comprised of an annular body defining first and second ends, the first end of the annular body defining an inlet assembly that is configured to draw operating gas into the gas propellant chamber and the second end defining an exhaust assembly that is configured to expel operating gas from the gas propellant chamber, the gas propellant chamber comprising a compressor positioned proximate the first end of the gas propellant chamber, a turbine assembly positioned proximate the second end of the gas propellant chamber, and a nuclear fuel chamber positioned within the annular body of the gas propellant chamber between the compressor and turbine assembly, wherein a drive shaft extending axially through the gas propellant chamber between the first and second ends couples at least the compressor to the turbine assembly; an annular containment wall annularly surrounding the gas propellant chamber, the annular containment wall defining a first end proximate the first end of the gas propellant chamber and a second end proximate the second end of the gas propellant chamber; and an integrated rotor/stator assembly, the integrated rotor/stator assembly comprising a rotor and a stator belt, the rotor connected to the drive shaft such that it is rotatably connected to the compressor and the rotor being configured to rotate, thereby generating electricity.

In some embodiments, the turbine assembly comprises one or more blade assemblies, each blade assembly comprising one or more turbine blades and configured such that each of the one or more turbine blades rotates during operation of the turbine assembly. In some further embodiments, the exhaust assembly comprises a nozzle and at least one of the one or more blade assemblies of the turbine assembly is in line with an exit of the nozzle. In still further embodiments, the at least one of the one or more blade assemblies of the turbine assembly in line with the exit of the nozzle is the rotor. In still further embodiments, the rotor is in engageable proximity of the stator belt, the stator belt coupled to an exterior surface of the nozzle such that rotation of the blade assembly as the operating gas exits the nozzle generates electricity.

In some embodiments, the apparatus further comprises an ion thruster powered by the integrated rotor/stator assembly.

In certain embodiments, the apparatus further comprises one or more generators, the one or more generators configured to generate electricity. In some embodiments, at least one generator of the one or more generators is connected to the drive shaft proximate to the second end of the gas propellant chamber. In some further embodiments, wherein the at least one generator of the one or more generators comprises shielding on one or more sides of the generator. In still further embodiments, the at least one generator rotates along the same axis as the compressor and the turbine assembly. In certain other embodiments, the at least generator is connected to the drive shaft via a gear box such that it rotates along a different axis than the compressor and the turbine assembly.

In some embodiments, one or more support members rotatably attach the drive shaft to the annular containment wall. In some further embodiments, one or more support members rotatably attach the drive shaft to a structure in which the apparatus is incorporated.

In certain embodiments, the annular body of the gas propellant chamber defines a region between the gas propellant chamber and the rotating nuclear fuel chamber, the region forming an interior bypass for a portion of the operating gas to pass around the nuclear fuel chamber. In certain further embodiments, the apparatus further comprises a circulation fan rotationally coupled to the compressor and the turbine assembly and disposed proximate to the compressor, wherein the circulation fan is configured to draw operating gas into the compressor and the interior bypass.

In some embodiments, the annular containment wall defines a region between the containment wall and the annular body of the gas propellant chamber, the region forming an exterior bypass for a portion of the operating gas to pass around the gas propellant chamber. In certain further embodiments, the apparatus further comprises a circulation fan rotationally coupled to the compressor and the turbine assembly and disposed proximate to the compressor, wherein the circulation fan is configured to draw operating gas into the compressor and the exterior bypass.

In accordance with one exemplary embodiment of the present disclosure, an apparatus for generating electricity comprises a gas propellant chamber comprised of an annular body defining first and second ends, the first end of the annular body defining an inlet assembly that is configured to draw operating gas into the gas propellant chamber and the second end defining an exhaust assembly that is configured to expel operating gas from the gas propellant chamber, the gas propellant chamber comprising a compressor positioned proximate the first end of the gas propellant chamber, a turbine assembly positioned proximate the second end of the gas propellant chamber, and a nuclear fuel chamber positioned within the annular body of the gas propellant chamber between the compressor and turbine assembly, wherein a drive shaft extending axially through the gas propellant chamber between the first and second ends couples at least the compressor to the turbine assembly, wherein the nuclear fuel chamber is a rotating nuclear fuel chamber configured to rotate along the drive shaft along with the compressor and the turbine assembly; an annular containment wall annularly surrounding the gas propellant chamber, the annular containment wall defining a first end proximate the first end of the gas propellant chamber and a second end proximate the second end of the gas propellant chamber; and one or more generators, the one or more generators configured to generate electricity.

In certain embodiments, the drive shaft is integrally formed with the rotating nuclear fuel chamber. In some embodiments, the drive shaft is connected to at least a first end of the rotating nuclear fuel chamber.

In some embodiments, one or more gear boxes are disposed proximate to the compressor, the one or more gear boxes configured to allow the compressor to rotate at a different rate than the rotating nuclear fuel chamber. In some further embodiments, a first gear box is disposed upstream of the compressor and a second gear box is disposed upstream of the rotating nuclear fuel chamber.

In some embodiments, one or more support members rotatably attach the drive shaft to the annular containment wall. In some other embodiments, one or more support members rotatably attach the drive shaft to a structure in which the apparatus is incorporated.

In some embodiments, the annular body of the gas propellant chamber defines a region between the gas propellant chamber and the rotating nuclear fuel chamber, the region forming an interior bypass for a portion of the operating gas to pass around the rotating nuclear fuel chamber. In certain further embodiments, the apparatus further comprises a circulation fan rotationally coupled to the compressor and the turbine assembly and disposed proximate to the compressor, wherein the circulation fan is configured to draw operating gas into the compressor and the interior bypass.

In some embodiments, the annular containment wall defines a region between the containment wall and the annular body of the gas propellant chamber, the region forming an exterior bypass for a portion of the operating gas to pass around the gas propellant chamber. In certain further embodiments, the apparatus further comprises a circulation fan rotationally coupled to the compressor and the turbine assembly and disposed proximate to the compressor, wherein the circulation fan is configured to draw operating gas into the compressor and the exterior bypass.

In some embodiments, the turbine assembly comprises one or more blade assemblies, each blade assembly comprising one or more turbine blades and configured such that each of the one or more turbine blades rotates during operation of the turbine assembly. In some further embodiments, the exhaust assembly comprises a nozzle and at least one of the one or more blade assemblies of the turbine assembly is in line with an exit of the nozzle.

In some embodiments, the at least one generator of the one or more generators is connected to the drive shaft via a gear box such that it rotates along a different axis than the compressor and the turbine assembly, the gear box disposed proximate to the second end of the gas propellant chamber. In certain further embodiments, the at least one generator of the one or more generators comprises shielding on one or more sides of the generator. In still further embodiments, a surface of the shielding is configured to at least partially divert the operating gas away from the generator as the operating gas exits the exhaust assembly.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below. Other features, aspects, and advantages of the subject matter will become apparent from the description, the drawings, and the claims.

BRIEF DESCRIPTION OF THE FIGURES

Figure 1:
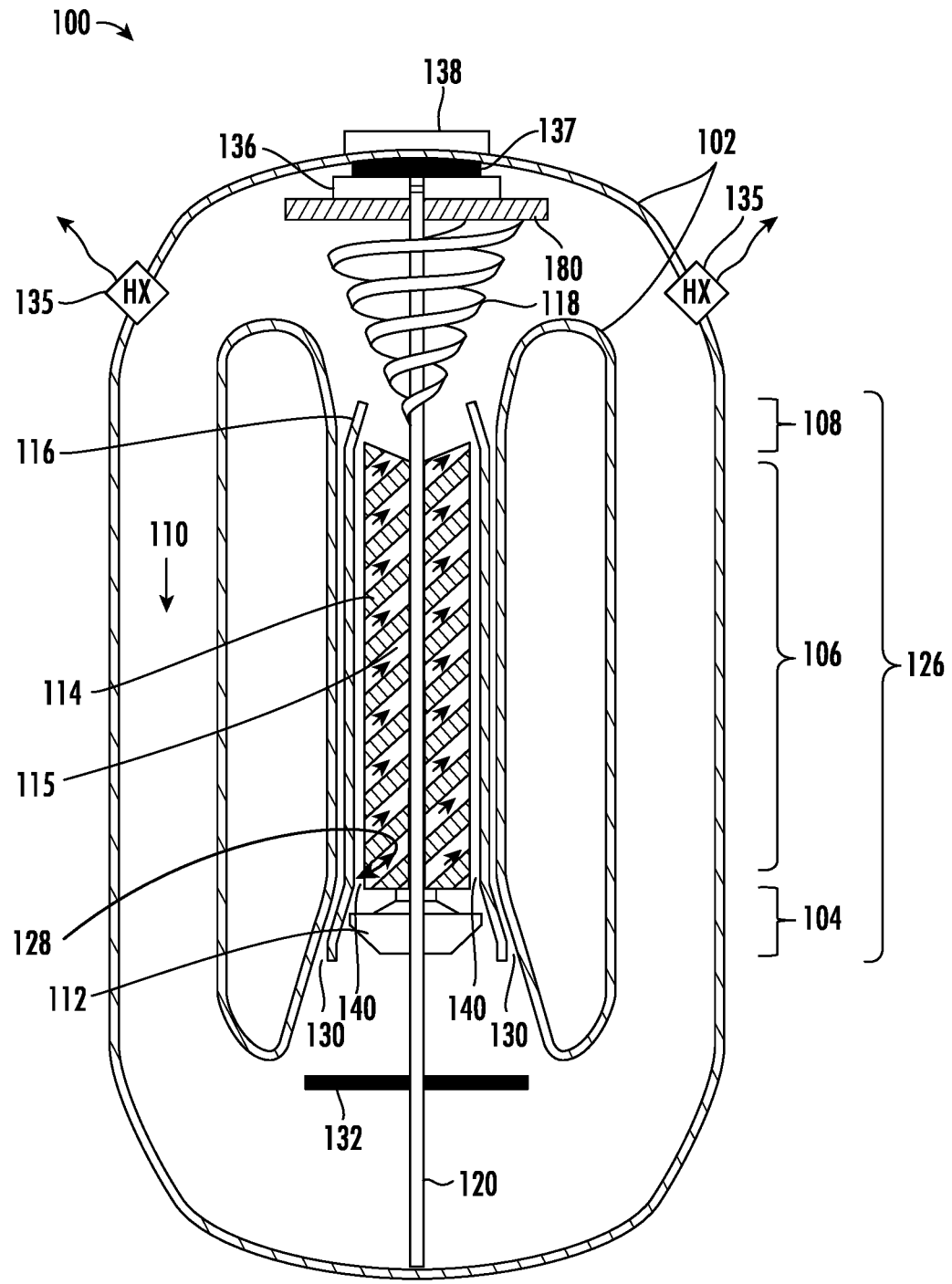
Figure 2:
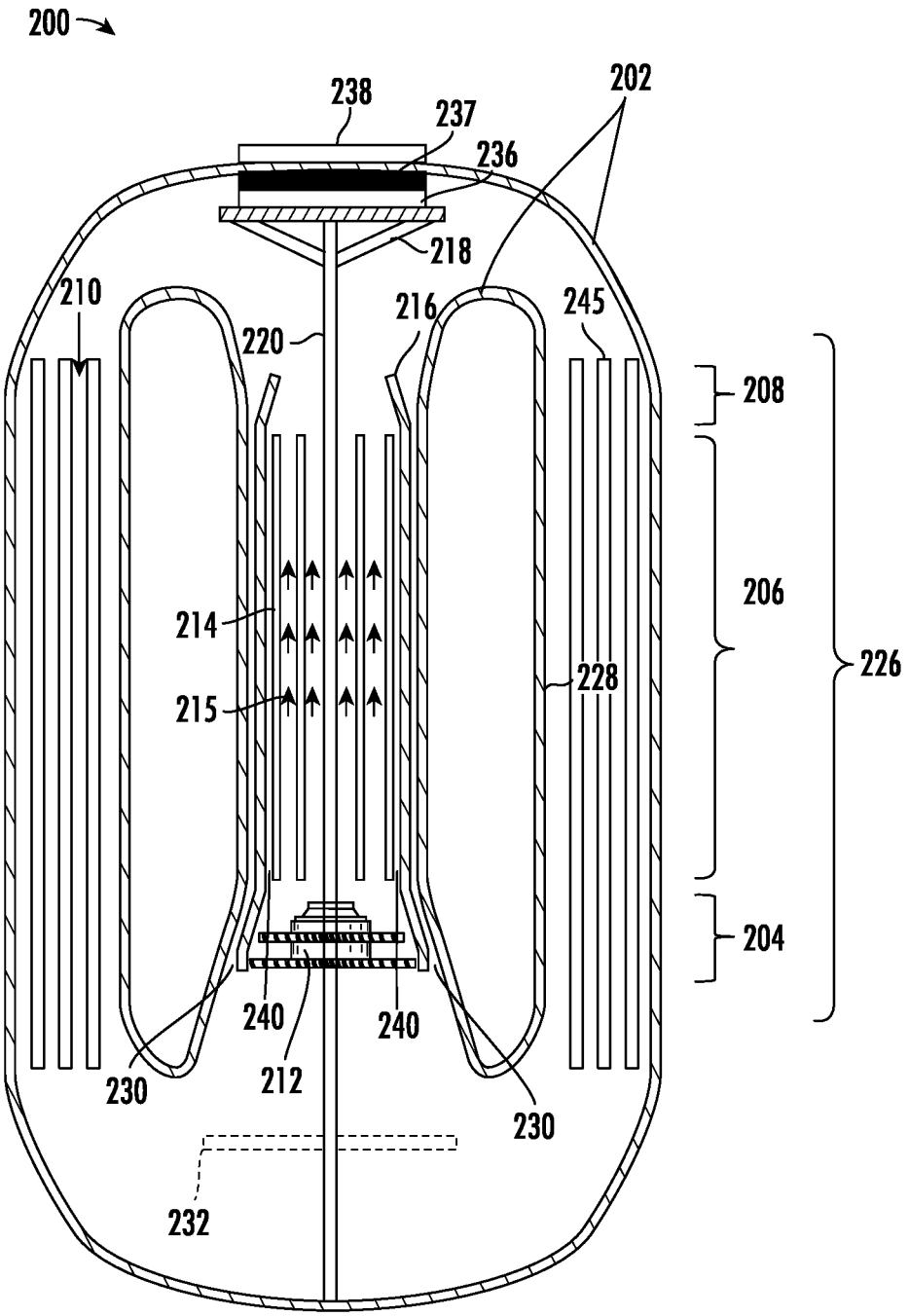
Figure 3:
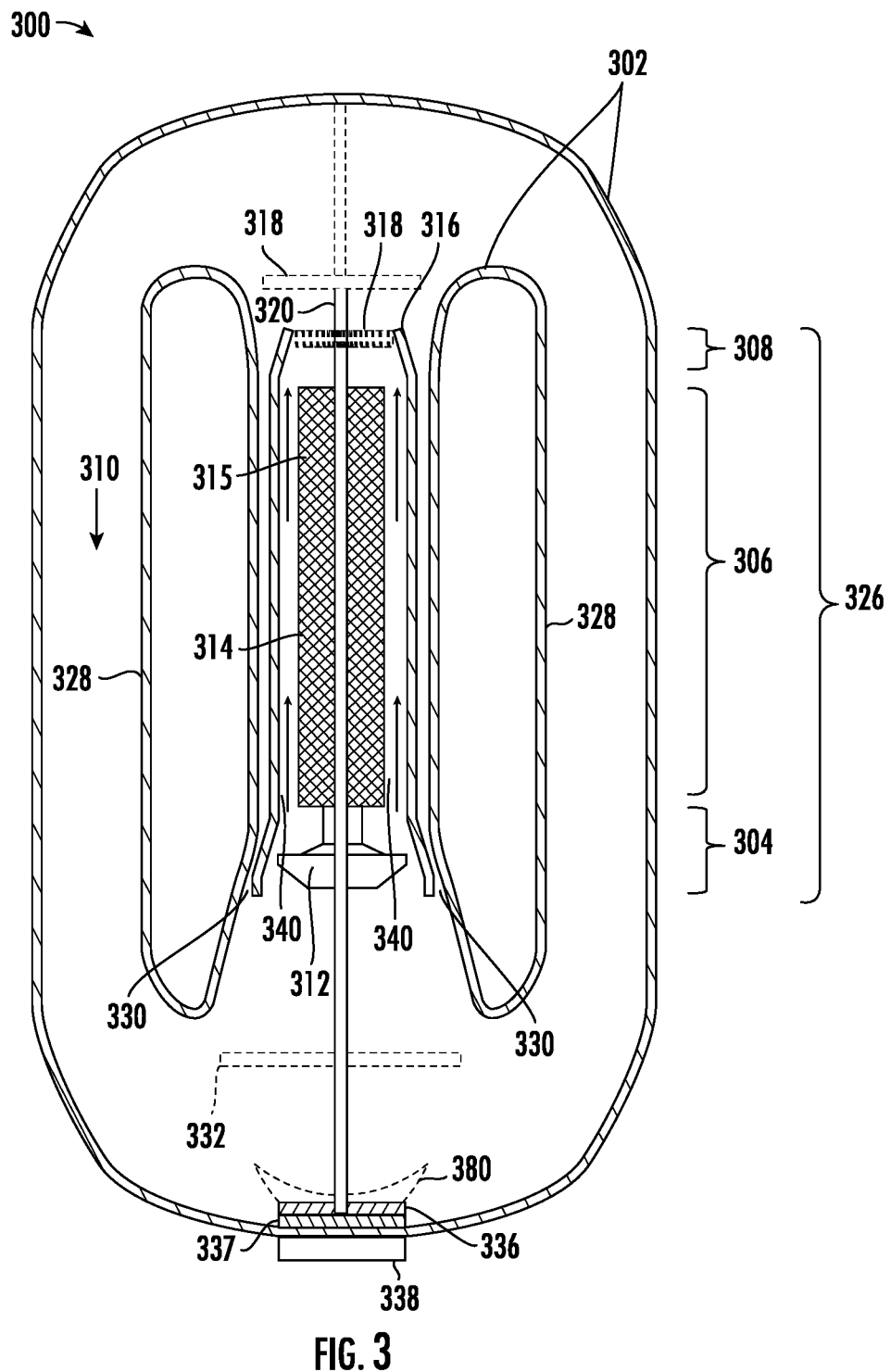
Figure 4:
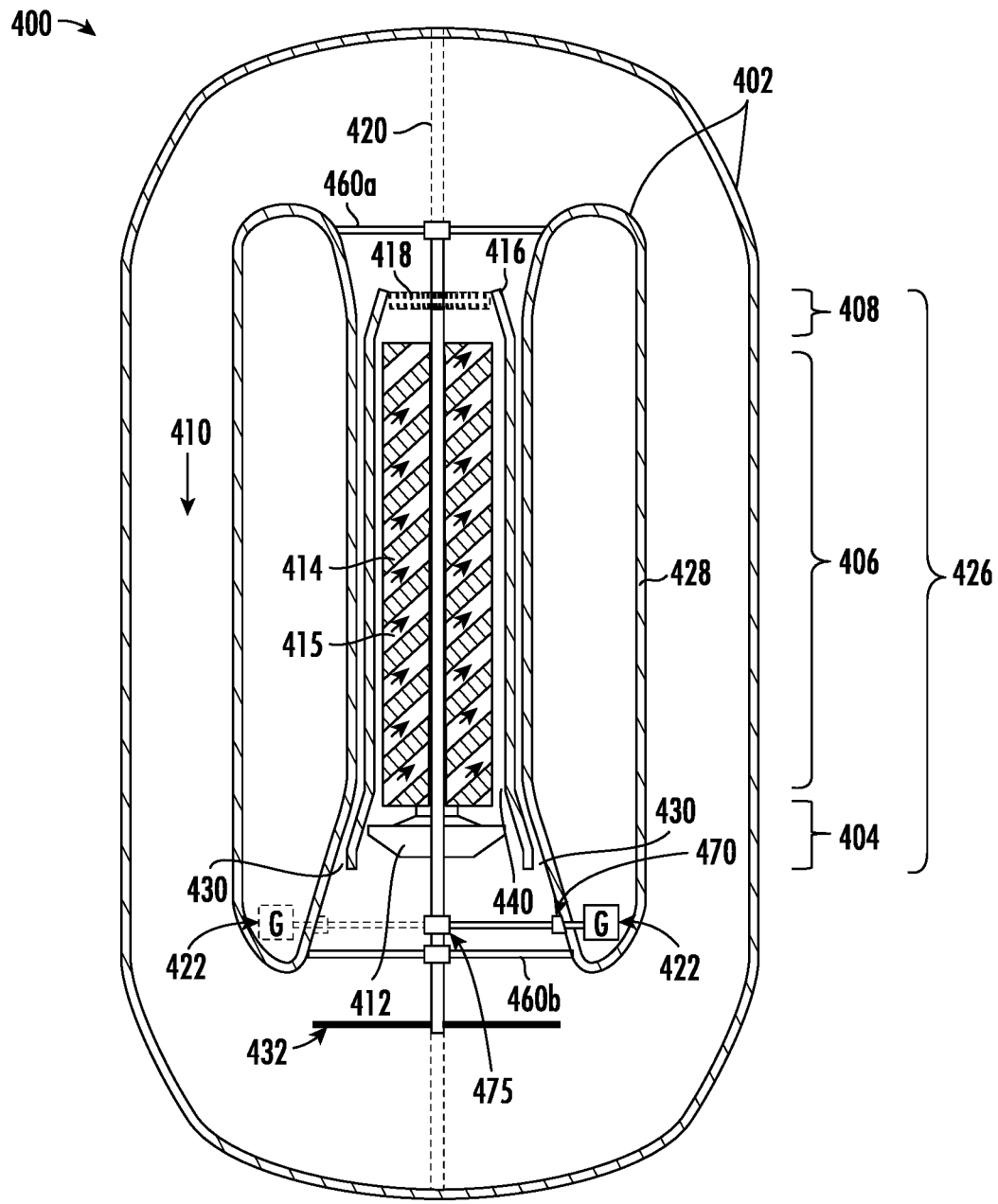
Figure 5:
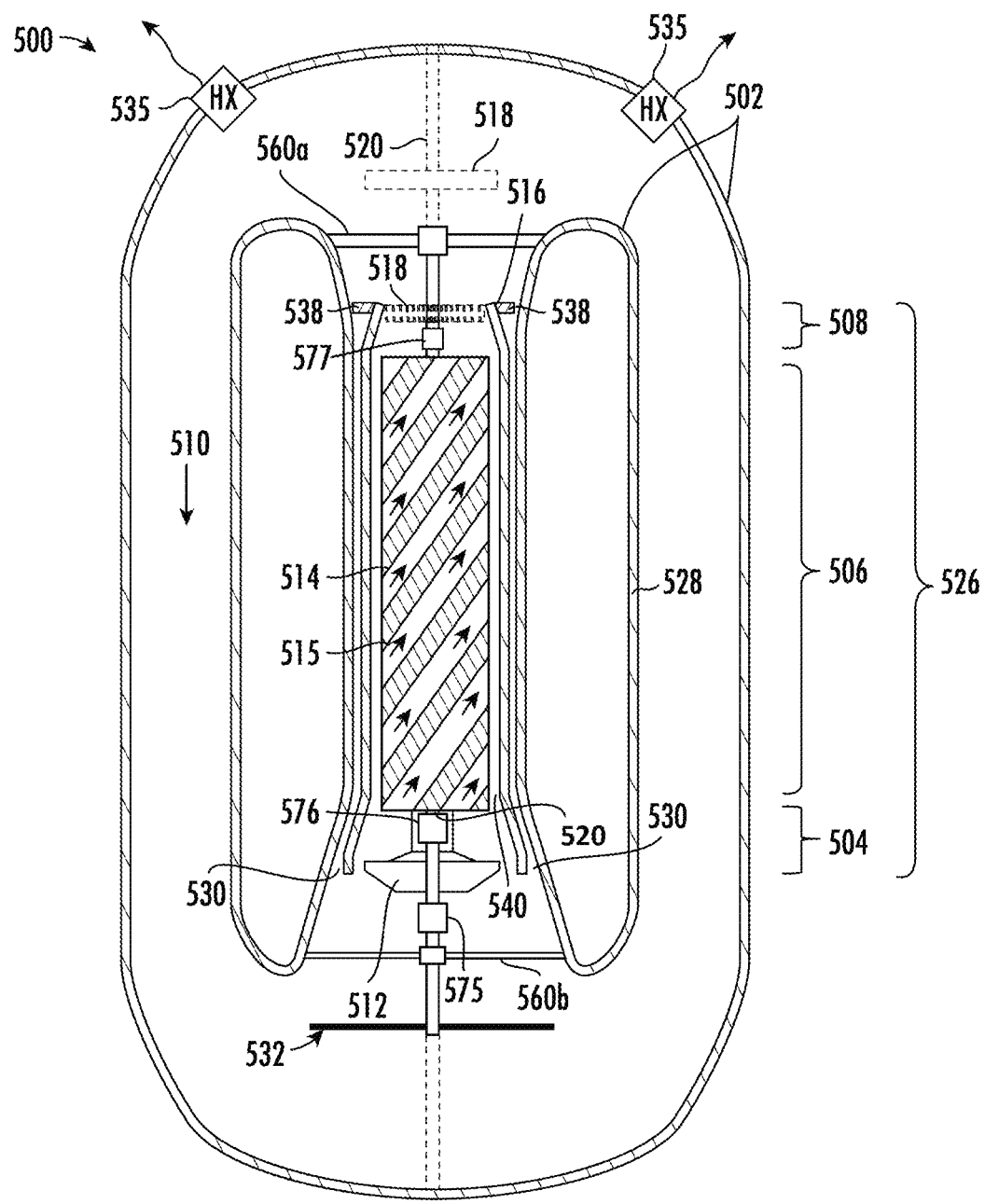
Figure 6:
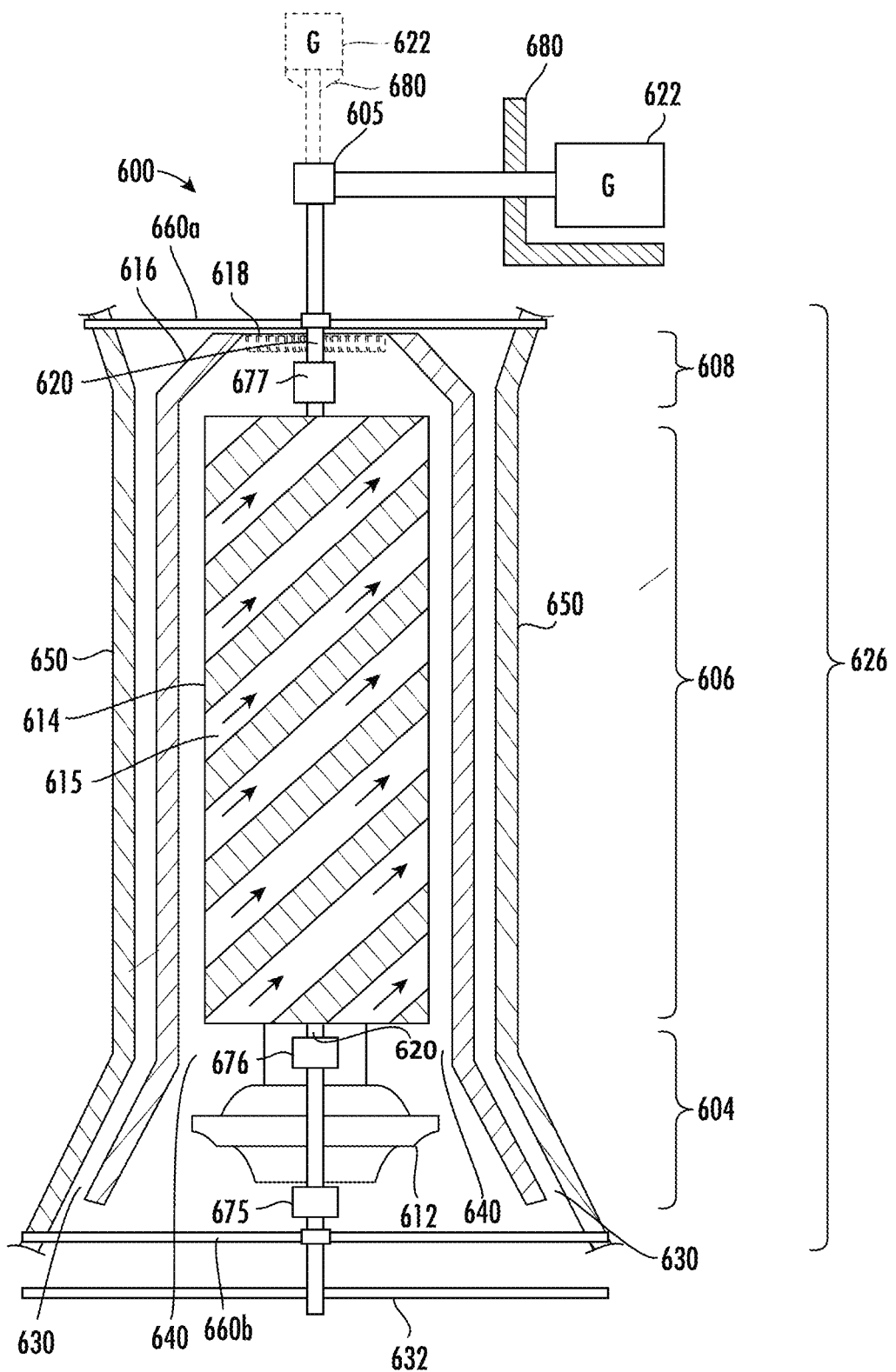
Figure 7:
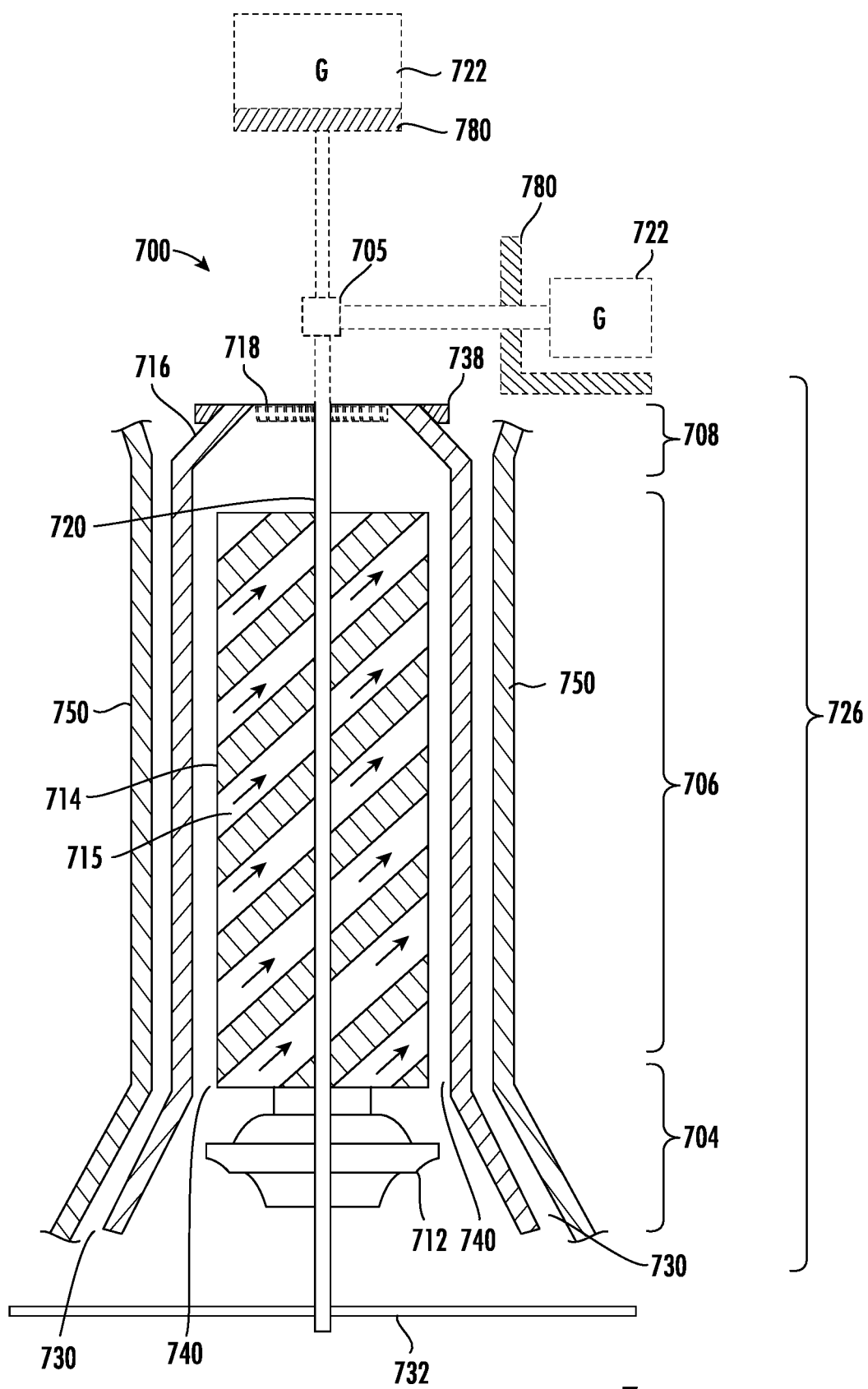
Figure 9:
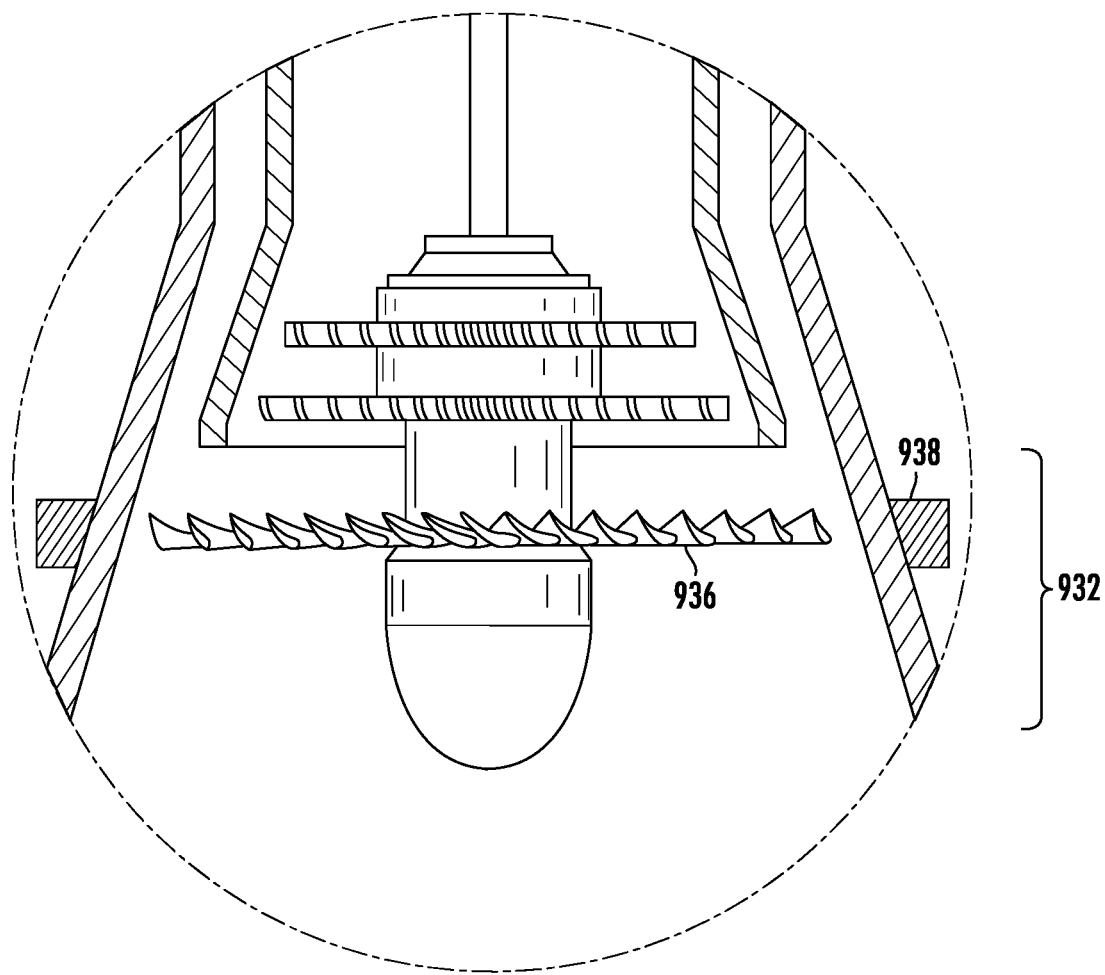
Figure 10:
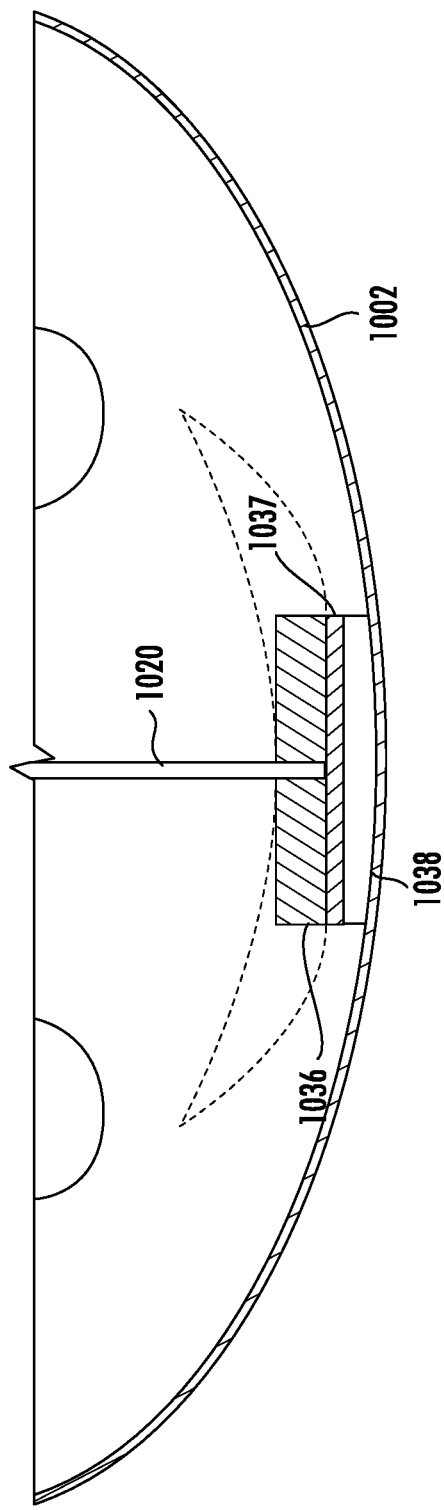
Figure 11:
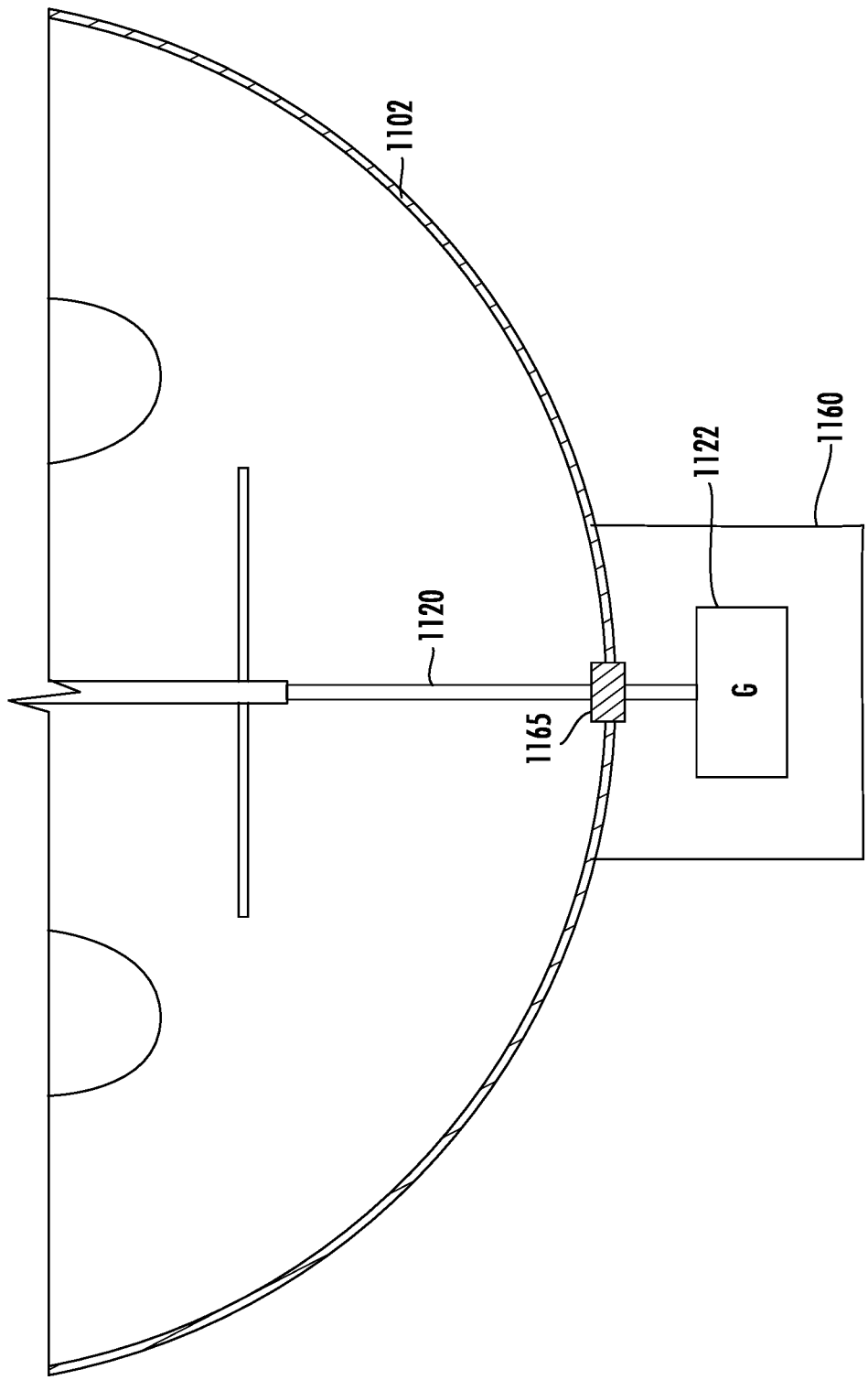

Having thus described certain example embodiments of the present disclosure in general terms above, non-limiting and non-exhaustive embodiments of the subject disclosure will now be described with reference to the accompanying drawings, which are not necessarily drawn to scale. The components illustrated in the accompanying drawings may or may not be present in certain embodiments described herein. Some embodiments may include fewer (or more) components than those shown in the drawings:

FIG. 1 illustrates a partial section view of a closed system nuclear power generation apparatus having a turbine blade assembly arranged in an expanding corkscrew-type configuration and a rotor/stator assembly partially integrated with the containment vessel in accordance with some embodiments discussed herein;

FIG. 2 illustrates a partial section view of a closed system nuclear power generation apparatus having a rotor/stator assembly partially integrated with the containment vessel in accordance with some embodiments discussed herein;

FIG. 3 illustrates a partial section view of a closed system nuclear power generation apparatus having a rotor/stator assembly partially integrated with the containment vessel in accordance with some embodiments discussed herein;

FIG. 4 illustrates a partial section view of a closed system nuclear power generation apparatus having a generator disposed in a cavity annularly surrounding the gas propellant chamber in accordance with some embodiments discussed herein;

FIG. 5 illustrates a partial section view of a closed system nuclear power generation apparatus with a rotating nuclear fuel chamber in accordance with some embodiments discussed herein;

FIG. 6 illustrates a partial section view of an open system nuclear power generation apparatus with a rotating nuclear fuel chamber in accordance with some embodiments discussed herein;

FIG. 7 illustrates a partial section view of an open system nuclear power generation apparatus in accordance with some embodiments discussed herein;

FIG. 8A illustrates a detail view of a rotor/stator assembly partially integrated with the containment vessel in accordance with some embodiments discussed herein;

FIG. 8B illustrates a detail view of a rotor/stator assembly partially integrated with the containment vessel with a tapered-shape cone in accordance with some embodiments discussed herein;

FIG. 9 illustrates a detail view of a rotor/stator assembly integrated with a circulation fan in accordance with some embodiments discussed herein;

FIG. 10 illustrates a detail view of a rotor/stator assembly fully integrated within the containment vessel in accordance with some embodiments discussed herein; and FIG. 11 illustrates a detail view of a generator and generator container in accordance with some embodiments discussed herein.

DETAILED DESCRIPTION

Some embodiments of the present disclosure will now be described more fully hereinafter with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

While no serious threats to public health or the environment have occurred in the United States from the operation of nuclear reactors in electrical power generation systems, the public perception of nuclear reactors includes several safety concerns, although many of these concerns may be exaggerated. Due to the size of the current commercial nuclear power generation stations as well as the design and inherent operational characteristics of the nuclear reactor, nuclear power generation stations must, to the extent possible, be operated continuously. Further, locations suitable for such large power generation facilities are limited, especially considering that large electricity demands are typically found in densely populated areas while sparsely populated areas usually have small electricity demands relative to the electricity supplied by a conventional commercial nuclear power generating station. Finally, many of the existing nuclear reactors are reaching the end of their originally licensed operational periods, while other reactors are being closed or are being considered for closing for economic reasons, primarily in unregulated markets.

The potential reduction in our existing nuclear fleet is occurring at a time of growing public interest in clean energy due in part to climate change concerns. Over the past decade, increasing industry and public interest has been given to small modular reactors ("SMRs") due to this reduction in our existing nuclear fleet and the recognized advantages of SMRs over current large nuclear reactors. These advantages include enhanced safety due to passive safety; lower capital costs due to modular components and factory manufacture; siting flexibility; greater applications such as heat process; and more proliferation resistance. The concerns about climate change have also led to increased interest in SMRs during the past decade. SMRs include both water-cooled reactors and other types of reactors, such as gas-cooled high-temperature reactors, molten-salt reactors and lead-cooled fast reactors, with some of these reactors also being classified as "advanced" SMRs.

Provided is an improved system for producing energy and generating electricity using a nuclear fueled reactor and methods of using the same. Various embodiments of the apparatus eliminate certain heat exchangers, piping, and other thermal conversion machinery typically utilized in other nuclear power generation apparatuses. In contrast to conventional systems, various embodiments of the present apparatus utilize kinetic energy from the operating gas exiting the nuclear-fueled reactor to directly generate rotational energy which can then be converted to electricity and/or mechanical energy.

Further embodiments of the present apparatus use a single phase coolant, in particular, a gas phase coolant. In contrast to prior systems, some embodiments of the present apparatus use gas (single phase fluid) as both the reactor coolant (e.g., heat removal agent and carrier) and working fluid in the energy conversion. In addition, some embodiments of the present apparatus use atmospheric gases (e.g., ambient gases) as the reactor coolant and working fluid. Further, in some embodiments, the nuclear energy source and conversion of kinetic energy to rotational energy and then to electricity can be integrated in a manner that eliminates the complex array of heat exchangers and piping often used in conventional systems. Embodiments of the present apparatus thereby provide an integral unit configuration that is a simpler, more reliable and safer design, one which may reduce the risks of heat exchanger breakdowns, leaks of various kinds and may reduce the risk of core damage.

Embodiments of the present apparatus have a scalable and adaptable design, being truly modular and capable of manufacture in a factory, where the nuclear fuel can be securely loaded within an integral unit. Factory manufacture means that the apparatus would have lower and more predictable capital costs. Such embodiments are easily and safely transportable, and can be designed to be highly nuclear proliferation-resistant. The apparatus is capable of wide-spread deployment over various applications, such as electricity generation, process heat, desalination, and power production in space.

In various embodiments of the present apparatus, the kinetic energy to generate electricity is produced by heating a pressurized operating gas flowing through a nuclear fuel chamber in a gas propellant chamber. The gas has dual functions—it is a primary coolant for the nuclear fuel chamber as well as working fluid for the energy conversion. Once heated, the operating gas directly impacts a conversion assembly for converting kinetic energy to rotational energy. The conversion assembly may include a variety of components in a variety of configurations. In some embodiments, the conversion assembly includes a turbine assembly wherein turbine blades are directly impacted by the operating gas.

In various embodiments, the conversion assembly is in communication with one or more generators. As the operating gas impacts the conversion assembly, a significant portion of the kinetic energy of the gas is converted to rotational energy by causing the blades of the conversion assembly to rotate. The rotational energy is then converted to electricity by way of one or more generators in communication with the conversion assembly. In some embodiments, the conversion assembly also includes a drive shaft that converts the rotational energy to mechanical energy for other energy production, separately or in addition to electricity generation. In certain embodiments, the apparatus provides thermal energy for various applications via the process heat removed from the system via one or more cooling mechanisms, separately or in addition to electricity generation.

As the operating gas exits the conversion assembly, in some embodiments, the operating gas is dispersed in a containment vessel, where it can travel back to the inlet assembly of the gas propellant chamber for recycle. In some embodiments, the spinning blades of the conversion assembly help to disperse the operating gas through the containment vessel. Accordingly, various embodiments of the present apparatus can be designed as a closed system, where the components are enclosed in a sealed containment vessel and the operating gas is contained in and continuously recycled through the apparatus during operation of the apparatus. Alternatively, in some embodiments, the present apparatus can also be designed as an open system, where a portion of the apparatus is surrounded by an adaptation of the containment vessel. In particular, in some open system embodiments, an annular containment wall surrounds at least a portion of the apparatus, defining first and second open ends, through which the operating gas passes into the surrounding environment during operation of the apparatus.

Various embodiments of the apparatus are generally designed to enable efficient fluid transportation through the apparatus, through each of the inlet assembly, nuclear fuel chamber, and exhaust assembly, to increase the velocity and volume of fluid impacting the conversion assembly. Various components of the apparatus and their arrangement in the apparatus allow for the high velocity and volume of fluid to flow through the apparatus as will be discussed throughout the present disclosure.

In various embodiments, the present apparatus allows for the fluid (i.e., the operating gas) to be propelled at the conversion assembly for high efficiency energy conversion. For instance, in some embodiments, the conversion assembly includes a turbine assembly in communication with a compressor. Both the turbine assembly and compressor include blades that rotate during operation such that no stationary blades are present during operation. The removal of stationary blades may avoid any energy losses or decrease in velocity due to the operating gas coming in contact with the stationary blades. In general, in various embodiments, neither the turbine assembly nor the compressor include a diffuser, which in conjunction with the turbine or compressor, may reduce the velocity of the fluid through the apparatus.

In some embodiments, the turbine assembly and compressor are connected by a drive shaft extending through, or formed as integral to, the nuclear fuel chamber such that both components rotate and continuously drive each other in the apparatus and avoid energy losses that may occur with two separately driven components (e.g., where the compressor and turbine assembly are driven separately). In certain closed system embodiments, including within a containment vessel, the drive shaft extends the entire length of the containment vessel, supported at one or both ends of the containment vessel. In some embodiments, the drive shaft extends a smaller portion of the length of the containment vessel. In addition, in some embodiments, high performance bearings (e.g., magnetic bearings) are used in the components (e.g., the turbine assembly) or at one or both ends of the drive shaft to minimize friction and thereby reduce reductions in velocity through the apparatus.

In some closed system embodiments, the containment vessel housing each of the inlet assembly, nuclear fuel chamber, and exhaust assembly is designed such that the operating gas is able to expand and thus cool in the containment vessel prior to re-entering the inlet assembly. In some further embodiments, the containment vessel includes other cooling mechanisms incorporated in a manner to facilitate, or at least not substantially impede, the gas transportation through the apparatus.

In some embodiments, the nuclear fuel chamber is structured to promote the velocity of the operating gas exiting the inlet assembly (e.g., compressor) through the nuclear fuel chamber. This may occur by, for example, structuring the nuclear fuel chamber with helical or spiral flow paths through the nuclear fuel chamber or otherwise configuring the flow paths to funnel through the nuclear fuel chamber, and various other configurations. The helical or spiral flow within the example nuclear fuel chamber, for example, may minimize flow vector changes of the operating gas. In some embodiments, the helical flow paths defined by the nuclear fuel chamber include entrances that are beveled or otherwise aerodynamically shaped to minimize disruption or drag on the entering gas flow. In some embodiments, one or both ends of the nuclear fuel chamber is indented or recessed (e.g., recessed indentation) to minimize the flow vector of the operating gas. In various embodiments, the components of the apparatus, including the gas propellant chamber and its components and the containment vessel (including the circulation path), are generally designed to minimize air and surface friction.

Various embodiments of the present apparatus provide an innovative carbon-free energy source for electricity, mechanical energy production, and process heat that improves safety and is highly proliferation-resistant, provides for smaller assemblies, capable of factory manufacture, and has an adaptable design to maximize potential applications. Some embodiments of the present apparatus are used for general electricity production (including clustering units together) or for special purposes, such as localized use or meeting peak demands, providing energy source for remote regions or regions with limited infrastructure, or applications where localized power source is needed and no fuel source is readily available. In still further embodiments, the present apparatus is used to provide, concurrently with or separately from the electricity, process heat and mechanical energy for various applications.

As used herein, the term "gas propellant chamber" generally refers to the structure housing part or all of the inlet assembly, the nuclear fuel chamber, and the exhaust assembly. In some embodiments, the components of the gas propellant chamber are physically connected and/or separated into two or more parts. Regardless, various embodiments of the gas propellant chamber are designed for continuous flow of the operating gas through the apparatus to allow the operating gas to be propelled at the conversion assembly and thus, in general, do not include significant physical or operational barriers beyond the main components themselves (e.g., compressor, turbine assembly, nuclear fuel chamber). That is, while the pressure and temperature of the operating gas increases along the gas propellant chamber, the operating gas generally does not experience pressure or temperature barriers between components defining distinct, sharp pressure differences between components. The pressure and temperature at the outlet of the compressor in some embodiments of the present apparatus satisfy the pressure and temperature requirements for the inlet of the nuclear fuel chamber and the nuclear fuel chamber is then designed so that the pressure and temperature at the outlet of the nuclear fuel chamber satisfy the velocity required at the inlet of the conversion assembly for a specific configuration. This more seamless approach results in an improvement in gas transportation through the apparatus (e.g., reduction in velocity losses across components, including pressure barriers). The more integrated system and seamless transition between components allows for a more compact and efficient system with fewer energy losses. For instance, in some embodiments, additional connections between components (e.g., physical barriers, piping changes, stationary blades, etc.) result in an energy loss (e.g., about 10-20% loss per component).

The gas propellant chamber is designed for the operating gas to enter through the inlet assembly, for the operating gas to be heated in the nuclear fuel chamber, and for the operating gas to exit through the exhaust assembly at a higher velocity than when the operating gas entered the chamber. Accordingly, in various embodiments of the present apparatus, the operating gas is propelled out of the chamber to directly impact a component for converting the kinetic energy to rotational energy (a "conversion assembly"), such as a turbine assembly. The components of the gas propellant chamber can be designed to accelerate the operating gas when exiting the nuclear power generation apparatus to the desired velocity.

Due to the integration of the components in the gas propellant chamber, the system may experience a single temperature differential across the chamber (e.g., as opposed to different temperature requirements for the outlet of one component and the inlet of the succeeding component). In some embodiments, the temperature difference across the gas propellant chamber may be about 300 K to about 1000 K, such as about 350 K to about 900 K, about 400 K to about 800 K, about 400 K to about 600 K, or about 400 K to about 500 K. The temperature difference may be related to the length of the flow path through the gas propellant chamber. For instance, to provide context in non-limiting examples, in some embodiments, the flow path is about 1 m to about 15 m, about 5 m to about 12 m, or about 7 m to about 10 m in length. In various embodiments, the single temperature differential defined by this improved structure reduces energy losses and increases operational efficiency.

The "nuclear fuel core," which may be generally referred to as the "fuel core," is housed in the "nuclear fuel chamber," which is part of the gas propellant chamber structure. The nuclear fuel core contains nuclear fuel elements including fissile material, such as uranium, plutonium, thorium, or a mixture thereof in the specific desired proportion.

The nuclear fuel chamber defines flow paths running longitudinally through the nuclear fuel chamber for the operating gas to flow through and transfer heat from the nuclear fuel elements of the nuclear fuel core to the operating gas. The flow paths are configured such that they run from one end of the nuclear fuel chamber to the other end of the nuclear fuel chamber. In various embodiments, other channels or openings with a variety of configurations or dimensions, in lieu of or in addition to the longitudinal paths run through the nuclear fuel chamber for the operating gas to flow. Additionally or alternatively, in some embodiments, one or more passages are included for the operating gas to flow around the fuel core.

In some embodiments, the nuclear fuel chamber includes helical or geometrical flow paths for the operating gas to travel through the nuclear fuel chamber. In some embodiments, such helical flow paths are in lieu of longitudinal flow paths. In still other embodiments, such helical flow paths are in addition to longitudinal flow paths. Such helical flow paths may provide increased effective travel length through the chamber (and thus, increased heating per length of nuclear fuel core) while maintaining a compact chamber. Further, the helical flow paths may help maintain the velocity of the operating gas by maintaining the helical flow exiting the compressor. For instance, as the compressor is generally designed without stationary blades, the compressor tends to produce a spiral or helical operating gas flow that proceeds into, and is maintained by, the nuclear fuel chamber. Such spiral or helical operating gas flows are structured to cause the operating gas to flow in a spiral flow pattern in the nuclear fuel chamber and as the operating gas exits the nuclear fuel chamber.

In various embodiments, the helical or spiral operating gas flows are routed through the nuclear fuel core in a manner to achieve the most effective cooling of the fuel core. This may include a fuel core structure to define a proportionally greater number of flow paths originating at the perimeter of the fuel core and then passing toward the center of the fuel core and having flow paths of varying diameters to increase the flow path in the hottest areas of the fuel core.

In various embodiments of the present apparatus, the nuclear fuel chamber incorporates a control system to control the nuclear reaction. For instance, the nuclear fuel elements can be manipulated by the control system to begin the nuclear fission process within the nuclear fuel chamber leading to a sustained nuclear reaction. The nuclear fuel elements may be manipulated by the control system to regulate the chain reaction within the nuclear fuel chamber, thereby regulating the energy produced by the apparatus. The nuclear fuel chamber can be designed to provide a sustained reaction that can continue for a period of years, subject to planned and unplanned stoppages. In some embodiments, the nuclear fuel chamber is a fast spectrum reactor, which may offer a longer fuel life, a higher burn-up of nuclear fuel, and a more compact assembly.

Further, in some embodiments, especially for certain space applications in which gravitational forces are minimal, the nuclear fuel chamber is designed to rotate with the blades of the conversion assembly, such as the rotating blades of a turbine assembly, and compressor of the inlet assembly. For example, in various embodiments, the nuclear fuel chamber is connected to a rotating nozzle, rotor, or the drive shaft, allowing rotation of the nuclear fuel chamber with the drive shaft. In non-limiting examples, the nuclear fuel chamber can be coupled to the drive shaft or the drive shaft is formed as an integral portion of the core. In such non-limiting embodiments, to allow the drive shaft and nuclear fuel chamber to rotate, portions of the drive shaft downstream and/or upstream of the nuclear fuel chamber are supported by bearings and beams (or other support members) that are attached to the containment wall or to the structure or apparatus to which the nuclear power generation apparatus is attached or in which it is incorporated or embodied or the surface of some external environment, in accordance with embodiments discussed herein. Such rotation may facilitate gas transportation and the rotating chamber would have a flywheel effect.

In some embodiments, two or more nuclear fuel cores (or fuel assemblies) are clustered in one nuclear fuel chamber with a single drive shaft running through the center of the nuclear fuel chamber and connected to the compressor and the energy conversion assembly. In some embodiments, two or more gas propellant chambers are contained on parallel axes in the containment vessel. In such clustered configurations, the nuclear fuel cores (or fuel assemblies) may be subcritical for transportation purposes and then become critical once at the desired site by neutronically connecting the clustered cores or chambers through a connecting medium. Various configurations of the nuclear fuel chamber and nuclear fuel elements are available as further discussed herein.

In various embodiments of the present apparatus, contemporaneously with beginning the fission process in the nuclear fuel chamber, rotational thrust is applied, such as via a motor (including through a stator/rotor assembly) or flywheel, to a rotational shaft ("drive shaft") to commence the rotation of certain components of the apparatus, such as one or more compressors, the blades of the turbine assembly, and one or more circulation fans.

In various embodiments of the present apparatus, the exhaust assembly of the gas propellant chamber can include a variety of components and may generally be designed to further increase the velocity of the operating gas exiting the nuclear fuel chamber. In some embodiments, the exhaust assembly includes a conversion assembly for directly capturing a significant portion of the kinetic energy and converting the energy into rotational energy and, in certain embodiments, includes components for converting the rotational energy into electricity. As will be discussed further below and shown in the accompanying figures, the exhaust assembly may include various components in a variety of configurations, such as a nozzle designed to further increase the velocity of the operating gas. In some embodiments, the exhaust assembly includes one or more turbines (e.g., one or more blade assemblies, each blade assembly comprising one or more turbine blades) in line with the nozzle, rotor/stator assemblies for directly converting the rotational energy into electricity within the exhaust assembly, etc.

In some embodiments, the nuclear fuel chamber (e.g., nuclear fuel core) is indented, inverted, or in a recessed conical shape at one or both ends of the nuclear fuel chamber. In certain embodiments, the indented, inverted, or recessed conical shape coincides with the exit of the elongated flow paths, to optimize the vector of the operating gas flow exiting the nuclear fuel core, including the angle at which the operating gas strikes the turbine blades (e.g., the one or more turbine blades of the one or more blade assemblies of the turbine assembly). Additionally or alternatively, in some embodiments, the indented, inverted, or recessed conical shape of the nuclear fuel core coincides with the entrance of the elongated flow paths, to optimize the vector of the operating gas flow entering the nuclear fuel core.

In some embodiments, the turbine assembly includes turbine blades disposed in an array around the drive shaft. As noted above, the turbine blades are generally designed to rotate during operation, rather than being an array of rotating and stationary blades as seen in some jet engines. An intricate array, including stationary blades, such as that seen in jet engines may not be workable because it may, for example, in an apparatus comprising a containment vessel, impede the flow of the working fluid exiting the turbine assembly such that the velocity of the working fluid is too slow to provide continued adequate circulation (e.g., gas transportation) through the containment vessel. In some embodiments, more than one array of turbine blades is used. The overall number and configuration of the turbine arrays may be limited by the dimensions of the system (e.g., total gas pathway length). The turbine assembly is generally designed to increase the speed of the turbine blades as the operating gas is propelled at the blades, leading to increased generation of energy. The turbine blades may be designed as per the application and power rating of the apparatus, all of which may be used to design the nuclear fuel chamber.

In some embodiments, magnetic bearings or other high-performance bearings (such as oil bearings with gas seals) are utilized to minimize friction. In some embodiments, the turbine blades are angled or curved to optimize the turbine assembly's angular velocity based on the speed and angle at which the operating gas may be impacting the turbine blades, subject to other aerodynamic considerations. The shape and length of the turbine blades may also need to take into consideration the need to increase gas transportation, including gas transportation after exiting the turbine assembly (e.g., minimizing an unnecessary impediment of the gas flow, plus directing the operating gas through the circulation path in closed system embodiment). In some embodiments, the turbine blades differ radially to capture more energy efficiently. For example, in some embodiments, the turbine blades are arranged in an expanding corkscrew-type configuration, such as seen in FIG. 1. An expanding corkscrew-type turbine blade configuration may better distribute the stress (e.g., mechanical, thermal, and/or radiation) on the turbine assembly and along the drive shaft. Additionally or alternatively, in some embodiments, the expanding corkscrew-type turbine blade configuration provides for better dispersion and flow of the operating gas after the gas exits the nuclear fuel chamber (e.g., in a spiral path flow when exiting a helical fuel core) and the exhaust of the gas propellant chamber, while also providing more flexibility in optimizing the surface area and angle at which the flow of the operating gas strikes the turbine blade.

The design emphasis for the turbine assembly in various embodiments of the present apparatus is increasing the axial velocity of the turbine blades, while keeping the turbine within design limitations for thermal, radiation, and mechanical stress. Although various embodiments of the present apparatus include optional ion thrusters or other propulsion assembly that is powered by the apparatus for propulsion (e.g., for loitering in certain space applications with minimal gravitational forces, etc.), such embodiments also can be capable of, as needed, concurrently generating electricity and/or thermal energy. There are various other ways in which the operating requirements and parameters of jet engines would differ, such as the need for fuel economy and noise reduction in jet engines.

In various embodiments, one or more components of the gas propellant chamber are generally nuclear qualified and suitable for high temperature operations as the apparatus provides high power density in a compact system. For instance, in some embodiments, ceramic materials are used for one or more of the components. In some embodiments, the components are configured for sustaining high pressures, such as up to about 10 MPa, such as up to about 8 MPa. In certain embodiments, the nuclear qualified components are certified to withstand radiation environments and be reliable and sufficiently sealed to prevent radioactivity releases. Materials may be selected to make sure there are no corrosion effects or other types of degradation.

The operating gas exiting the nuclear fuel chamber can be used to generate electricity by various components. For instance, as discussed further below with respect to various embodiments, one or more turbines, nozzles, blade assemblies, etc. are used to capture the kinetic energy from the operating gas and convert such to rotational energy. Various configurations may be used without deviating from the intent of the present disclosure. For instance, in some embodiments, the operating gas is directed at and rotates the blades of a turbine assembly in proximity to the exhaust assembly. In some further embodiments, a turbine assembly is in communication with a generator or other apparatus for converting the rotation of the shaft or other component(s) to electricity, such as a rotor/stator assembly.

In some embodiments for generating electricity, for example, the apparatus will generally include one or more generator(s) or similar component(s) for converting rotational energy to electricity. In such embodiments, the generator may be any suitable generator. For example, in some embodiments, the generator is an electrostatic generator. The generator may be incorporated into and/or with the apparatus in a variety of configurations. For example, in some embodiments, the generator is integrated, wholly or partially, into the conversion assembly. In some further embodiments comprising a containment vessel, the generator is disposed outside of the containment vessel, within the containment vessel, or a combination thereof. For instance, in some embodiments, electricity is created using a generator positioned exterior to the containment vessel and downstream of the turbine assembly, while in some embodiments, a rotor/stator assembly is incorporated within the containment vessel, for example, in the exhaust assembly and/or the inlet assembly. For instance, in some embodiments, a circulation fan disposed proximate to the compressor and configured to draw operating gas into the compressor is configured to operate as a rotor in communication with, or otherwise within engageable proximity of, a stator belt to convert kinetic energy to rotational energy and then to electricity through the rotor/stator assembly.

In still further embodiments, a rotor/stator assembly is disposed at either or both ends of the drive shaft within the containment vessel, proximate to the inner surface of the containment vessel. In such embodiments, the rotor is connected (e.g., integrally formed with or fixedly coupled to) to the drive shaft extending axially through the containment vessel, and the stator is disposed such that it is in communication with the rotor to convert kinetic energy to rotational energy and then to electricity through the rotor/stator assembly. In some embodiments, the rotor incorporates fins or other aerodynamic fan-like structure on a surface of the rotor facing the interior of the containment vessel to facilitate gas transportation. In some embodiments, the rotor and/or drive shaft is further supported and/or stabilized by magnetic bearings or other high-performance bearings.

In still further embodiments, the generator is partially integrated with the containment vessel. For instance, in some embodiments, a rotor is connected (e.g., integrally formed with or fixedly coupled to) a rotational drive shaft extending axially through the containment vessel, the rotor being disposed within the containment vessel and positioned proximate to an interior surface of the containment vessel. Positioned proximate to the exterior surface of the containment vessel and immediately opposite, or otherwise within engageable proximity, to the rotor, a stator is disposed and in communication with the rotor to convert kinetic energy to rotational energy and then to electricity through the rotor/stator assembly. Such configuration may reduce the size of the design by partially integrating the generator with the containment vessel and may improve the efficiency of the apparatus in some embodiments. In various embodiments, the thickness of the containment vessel is structured for supporting such a partially integrated rotor/stator assembly. For example, in some embodiments, depending on the configuration of the containment vessel, this may include added thickness and/or lateral supports in the containment vessel at and/or in the vicinity of the rotor/stator assembly. Additionally or alternatively, in some embodiments, the rotor and/or drive shaft is further supported and/or stabilized by bearings and supporting beams and other stabilizing structures.

In some embodiments, the rotor and/or drive shaft is further supported and/or stabilized by magnetic bearings or other high-performance bearings. In still further embodiments, radioactive and/or heat shielding is positioned in the interior of the containment vessel and proximate to an opposing surface of the rotor, such that the rotor is positioned between the wall of the containment vessel and the radioactive and/or heat shielding.

In some embodiments, the partially integrated rotor/stator assembly is disposed at a second end of the containment vessel, the second end of the containment vessel positioned proximate to the exhaust assembly, while in some embodiments, the rotor/stator assembly is disposed at a first, opposing end of the containment vessel, the first, opposing end of the containment vessel positioned proximate to the inlet assembly. For instance, in some embodiments, the partially integrated rotor/stator assembly is disposed at the second end of the containment vessel, and the rotor and/or radioactive shielding is attached or coupled to a turbine assembly. The turbine assembly coupled to the rotor and/or radioactive shielding may be constructed in any suitable configuration. For example, in some embodiments, the turbine assembly is configured as an expanding corkscrew turbine assembly as disclosed in detail herein. In a preferred embodiment, the partially integrated rotor/stator assembly is disposed at the first end of the containment vessel, proximate to the inlet assembly, wherein the operating gas is cooler. In some embodiments, the rotor (or the radioactive shielding) disposed at the interior of the containment vessel incorporates fins or a fan-like structure on a surface of the rotor facing the interior of the containment vessel. Such fins or fan-like structures may assist in facilitating the transportation of the operating gas toward the inlet assembly.

In still other embodiments, a generator is fully integrated within a generator container, the generator container being attached to the exterior of the containment vessel or otherwise forming an extension to the containment vessel, the extension forming a sealed compartment separated from the flow of the operating gas in the containment vessel. In some embodiments, the generator container is disposed at the first end of the containment vessel, while in some embodiments, the generator container is disposed at the second end of the containment vessel. In various embodiments, the generator container is filled with any suitable gas, including, in some embodiments, the same gas used as the operating gas within the containment vessel. In such embodiments utilizing the same gas as the operating gas is optimal in instances in which it is desirable to mitigate the risk of gas leakage between the two chambers.

In some embodiments, the rotational drive shaft extending axially through the interior of the containment vessel further extends through an aperture or opening defined in the exterior wall of the containment vessel, a generator coupled to the drive shaft and the drive shaft extending to the exterior of the containment vessel and, in some embodiments, into the generator container. In some embodiments, a seal is disposed at the junction of the aperture and the drive shaft to minimize or otherwise sufficiently prevent the passage or leakage of the operating gas into the generator container and/or of the operating gas into the containment vessel. In still further embodiments, a generator is connected to the rotational drive shaft extending into the generator container. In some embodiments, the generator container is further cooled via air, water, and/or a gas refrigeration system.

In still further embodiments, one or more generators is disposed such that the generator(s) rotates along a different axis than, or along a parallel axis to, the rotational drive shaft extending through the apparatus. For example, in some embodiments, the rotational drive shaft includes a gear box or couplings, allowing one or more generators to be placed on an axis different than or parallel to the axis of the drive shaft extending through the apparatus. For instance, in certain closed system embodiments, the containment vessel includes one or more enclosed cavities annularly surrounding the gas propellant chamber. For example, in some embodiments, such one or more enclosed cavities is defined by an inner wall of the containment vessel. In some embodiments, the pressure within the one or more enclosed cavities is the nominal pressure in the containment vessel. In some further embodiments, the one or more enclosed cavities comprise the same gas as the operating gas circulating in the apparatus.

In other embodiments, the one or more enclosed cavities comprise a different gas than the operating gas circulating in the apparatus. It may be desired in such embodiments to place one or more generators within such one or more enclosed cavity(ies), the one or more generators rotatably connected to the drive shaft via separate transmission shaft(s) connected to the gear box or other couplings attached to the drive shaft. For example, in some embodiments, the gear box or couplings is attached to the drive shaft at a location upstream of the compressor having one or more rods extend from the gear box, the rod(s) extending perpendicular to the drive shaft. In some embodiments, a seal is disposed at the junction of the rod through the wall (e.g., the inner wall of the containment vessel) separating the enclosed cavity from operating gas flowing in the circulation path, the seal minimizing or otherwise sufficiently prevent the passage or leakage of the operating gas into the enclosed cavity.

In still further embodiments, for example, in certain open system embodiments, a generator is placed perpendicularly or parallel to the rotational drive shaft, such that the generator is not directly in line with the most intense flow of the operating gas (e.g., heat, velocity, and radiation) exiting the gas propellant chamber. In some embodiments, regardless of its location, the apparatus comprises heat shielding, radioactive shielding, or a combination thereof to further protect the generator (or other systems or components attached to or in proximity of the nuclear core) from the most intense flow of the operating gas exiting the gas propellant chamber.

In some embodiments, the apparatus is an open system such that a containment wall annularly surrounds at least a portion of the apparatus, the annular body defining two open ends and allowing the operating gas to pass through and around the apparatus without the requirement of a path for recirculation of the operating gas such that the operating gas passes into the surrounding environment during operation of the apparatus. For instance, in some embodiments, the open system apparatus comprising an annular containment wall is utilized in the upper atmosphere (e.g., low earth orbit) such that it uses ambient atmospheric gas as the both the reactor coolant (heat removal agent and carrier) and as a propellant. In certain embodiments, other gases with high specific heat, such as hydrogen or carbon dioxide, may be injected into the compressor or nuclear fuel core as a supplemental coolant. The containment wall may be constructed of any suitable material and in any suitable configuration, such as a cylindrical form, without deviating from the intent of the present disclosure. In some embodiments, the containment wall comprises shielding, such as heat shielding, radiation shielding, or a combination thereof.

In some embodiments, the apparatus includes a containment vessel for housing one or more of the components of the apparatus. The containment vessel houses the gas propellant chamber and, in various embodiments, provides a path for recirculation of the operating gas ("circulation path"). The containment vessel may be constructed of any suitable material and in any suitable configuration without deviating from the intent of the present disclosure. For instance, in some embodiments, radioactive shielding is included as needed throughout the containment vessel, such as in and around the nuclear fuel chamber. Further, in some embodiments, the containment vessel has more than one layer, such as an inner containment vessel layer and an outer containment vessel layer. In some embodiments, an outer containment vessel layer defines a vacuum around the inner containment vessel layer. For instance, in some embodiments, an outer containment vessel is included that operates at negative pressure while the inner containment vessel has pressurized gas. Additionally or alternatively, in some embodiments, such inner containment vessel includes piping to vent the gas.

In various embodiments, the apparatus is a closed system, the containment vessel being a sealed structure containing the operating gas and the nuclear fuel chamber as well as other components of the apparatus. The containment vessel can be designed to comply with regulatory, safety, and security requirements, and may have any shape that complies with the above mentioned requirements, fulfills its purpose with regard to the configuration of the equipment therein, and satisfies other design parameters, such as operating gas transportation within the apparatus and incorporating the mechanics needed to cool the circulating operating gas such that when the operating gas enters the nuclear fuel chamber, the temperature of the operating gas has been lowered to the appropriate level.

For instance, in some embodiments, the interior of the containment vessel is shaped to facilitate the transportation and cooling of the gas within the structure. In some embodiments, the containment vessel is designed to provide a circulation path having a wider, expanded diameter than compared to the path of the operating gas passing through the exhaust assembly. In some embodiments, the containment vessel extends beyond either side of the exhaust assembly and the inlet assembly. That is, in some embodiments, the circulation path is significantly larger than the path of the operating gas through the gas propellant chamber, particularly through, the exhaust assembly. Accordingly, in various embodiments, the operating gas is cooled significantly when traveling through the circulation path back to the inlet assembly.

In various embodiments, the containment vessel incorporates mechanisms for cooling the interior sides of the structure. Additionally or alternatively, in some embodiments of the present apparatus, cooling pipes are included in the interior of the containment vessel as further means for cooling the circulating gas thereby transferring some of the heat to secondary media. In certain embodiments, additionally or alternatively, the present apparatus includes additional passages for the operating gas to travel and cool down (e.g., through additional heat exchangers). The larger the temperature difference between the inlet assembly and the exhaust assembly, the more efficient the system will be. In some embodiments, the operating gas is cooled in the containment vessel through not just radiant cooling, which may be insufficient due to the large temperature differential required between the exhaust assembly and inlet assembly, but also through forced convection and conduction. In some embodiments, a cooling mechanism is disposed between the inner and outer containment vessel layer such that operating gas traveling through the containment vessel may be cooled upon contact with the inner containment vessel layer (the outer containment vessel layer generally not being in contact with the operating gas).

Circulation fans for facilitating the transportation of the operating gas through the structure is included in various embodiments of the containment vessel. In some embodiments, the drive shaft for some of these fans is coupled to the drive shaft for the compressor and turbine assembly to reduce energy losses. Various embodiments of the apparatus can also be scaled depending on the uses required for the system and can be designed in either a large or a very small integral reactor-converter configuration. In some embodiments, the apparatus includes heat extraction passages to process heat for commercial or other purposes. In addition to such heat extraction passages, it may be beneficial to include heat exchangers for process or district heat in cases where the operating gas is not inert or the containment vessel is a closed vessel. In some embodiments, the heat exchanger aids in cooling the gas as it circulates.

Some open system embodiments of the present apparatus also include other cooling mechanisms to cool or augment the cooling of the nuclear fuel core, gas propellant chamber, and/or the operating gas. For example, in some embodiments, vaporization of one or more of the ambient atmosphere, the operating gas, a supplemental coolant (e.g., HFE 7100), or a combination thereof in or proximate to the one or more bypasses is used. In certain embodiments, injectors, similar to fuel injectors in a fuel injection system, are used to vaporize the ambient atmosphere, the operating gas, supplemental coolant, or a combination thereof.

In various embodiments, the supplemental coolant is the sole cooling fluid present in the bypass. In some embodiments, the apparatus utilizes thermal radiation panels to cool or remove heat from the nuclear fuel core and gas propellant chamber. In some further embodiments, the apparatus transfers heat to its environment via conduction cooling (e.g., dumping excess heat through a solid connected with a cooler surface). Such embodiments may be beneficial on Earth or on another planet. In still further embodiments, in environments with sufficient atmosphere, the apparatus utilizes convection cooling via fins or other apparatuses, which increase the convection surface area.

In some embodiments, the operating gas is any suitable gas, such as air, argon, hydrogen, helium, carbon dioxide, xenon, neon, nitrogen, or other suitable gas, including combinations of one or more suitable gases. For instance, in some embodiments, the operating gas includes atmospheric gas in the environment on or surrounding Earth, Mars, or other planets.

In some embodiments, an inlet assembly is generally configured to draw operating gas into the nuclear fuel chamber and does so by including various components such as one or more compressors, circulation fans, and other similar components. In various embodiments, the inlet assembly is shaped to draw operating gas into the nuclear fuel chamber and/or be positioned along the apparatus to increase the draw of operating gas into the nuclear fuel chamber.

In some embodiments, a compressor is added to the inlet assembly to direct the operating gas to the nuclear fuel chamber and further increase the pressure of the operating gas, thereby increasing the efficiency of the apparatus. In certain embodiments, a compressor configured to compress the operating gas entering the inlet assembly is positioned in the inlet assembly with a drive shaft. A variety of configurations of a compressor may be used, as will be discussed further, such as an axial compressor or centrifugal compressor.

In various embodiments, the compressor has one or more stages of compressor blades, though with each stage, the compressor blades are generally configured to rotate during operation. That is, in various embodiments, the compressor is generally designed to not include stationary blades, which may impede the flow of the operating gas through the apparatus, reducing the velocity of the gas and also resulting in energy losses. In this regard, in some embodiments, a diffuser is not used with the compressor as a diffuser may impede the flow through the compressor and reduce the velocity of the operating gas through the apparatus.

In various embodiments of the present apparatus, the compressor is integrated with the other components in the gas propellant chamber to provide a seamless operating transition between components. In some embodiments, the compressor is connected to a drive shaft, which, in certain embodiments, runs through a channel defined in the nuclear fuel chamber thereby connecting the compressor to a conversion assembly. Coupling the drive shaft to the compressor and conversion assembly through the nuclear fuel chamber allows the power from the conversion assembly (e.g., turbine assembly) to directly rotate the compressor, thereby minimizing the energy losses resulting from using a different power source. Coupling of the components (e.g., the compressor and conversion assembly) through the nuclear fuel chamber provides a fully integrated system and improves gas transportation through the apparatus and allows for smaller overall dimensions.

In some embodiments, the apparatus includes one or more circulation fans to facilitate gas transportation through the structure. For instance, in certain open system embodiments in a stationary or nearly stationary environment (e.g., loitering in the mesosphere), a circulation fan is placed upstream of the compressor, drawing an adequate flow of operating gas into the compressor and, if present, one or more bypasses. In some embodiments, the circulation fan is connected or coupled to a drive shaft of the apparatus connecting various components of the apparatus. By coupling the circulation fan to the conversion assembly and the compressor through the nuclear fuel chamber, the addition of the circulation fan provides improved gas transportation while not requiring a separate power supply to power the circulation fan.

Unlike traditional jet engines, in some embodiments, the present apparatus is configured to remain generally stationary (though the apparatus and/or certain components may be movable in certain embodiments). The design emphasis for various embodiments of the present apparatus is on axial velocity rather than thrust. Thus, various embodiments of the present apparatus do not need certain components traditionally found in jet engines, such as both a high pressure compressor and a low pressure compressor. Further, in various embodiments of the present apparatus, the compressors do not need diffusers, as such may create drag on the gas flow in the apparatus. In various embodiments of the present apparatus, the apparatus is a closed system or an open system using ambient gas similar to jet engines.

In some embodiments, one or more bypasses are included in the apparatus to bypass the nuclear fuel chamber. Such bypasses may be positioned in various locations, including in the interior of the gas propellant chamber, external to the annular body of the gas propellant chamber, or a combination thereof. For instance, in some embodiments, an interior bypass is located internally to the gas propellant chamber, in the region between the nuclear reactor core and the interior wall of the annular body of the gas propellant chamber, allowing the operating gas to pass around the exterior of the nuclear fuel chamber.

In some embodiments, an exterior bypass is located external to the annular body of the gas propellant chamber. For example, in some embodiments, including in an containment vessel, the containment vessel has an inner wall defining a region between the inner wall and the annular body of the gas propellant chamber, the region forming a bypass for the operating gas to pass around the annular body of the gas propellant chamber. In other embodiments including a containment wall surrounding at least a portion of the apparatus, a region is defined between the surrounding containment wall and the exterior of the annular body of the gas propellant chamber, the region forming an exterior bypass for the operating gas to pass around the annular body of the gas propellant chamber.

In some embodiments, a circulation fan is included to direct operating gas to one or more bypasses (as well as to the compressor and nuclear fuel chamber) by positioning the circulation fan upstream of both the inlet to the nuclear fuel chamber and the one or more bypasses. Bypasses may provide cooling, and thus, better control, of the nuclear fuel chamber as well as improve gas transportation (and gas velocity) through the apparatus. A bypass allows for a greater operating gas volume and, in some embodiments, is unrestricted or only partially restricted through the gas propellant chamber to aid in gas transportation through the apparatus, including the circulation path.

Various other components may be included throughout the apparatus such as cooling pipes, flywheels, wiring, sensors, controls, etc. For instance, in some embodiments, the apparatus incorporates a flywheel, which may be coupled to or otherwise in communication with the energy conversion assembly, a generator or similar apparatus. The dimensions and configuration of the flywheel can be determined by several factors, such as the flywheel's expected angular velocity. In some embodiments, the flywheel is supported and stabilized by magnetic bearings or other high-performance bearings to minimize surface friction.

In various embodiments, the flywheel incorporates, to the extent feasible, the current state of the art for high-performance flywheels in the design and integration of the flywheel in the apparatus. In some embodiments, the flywheel provides flexibility to the overall design and provides backup electrical generation, as well as augments the rotational energy provided to rotate certain components of the apparatus such as the compressor or fan. In some embodiments, the flywheel offers an added safety benefit to the apparatus since the flywheel can be engaged if needed to continue the circulation of the operating gas in the event the fuel core needs to be shutdown. In various embodiments, the flywheel also offers the advantage of using or storing renewable-fuel-generated electricity, especially during peak production times for such fuel. In certain embodiments, the flywheel is housed in a vacuum chamber. In some embodiments, the flywheel is incorporated into the containment vessel along with the inlet assembly, nuclear fuel chamber, and exhaust assembly. In various embodiments, the flywheel, as well as the generator, offers the opportunity to begin the initial rotation of the operating gas in the apparatus by engaging and spinning the blades of the conversion assembly or any similar apparatus, and potentially the spinning of one or more compressors and/or fans disposed at the inlet assembly of the gas propellant chamber.

In some embodiments, the apparatus comprises, or is used in operation with, a gas filtration or air cleaning system. For example, in certain embodiments, in instances wherein the apparatus is deployed as an open system in an environment such that the operating gas exhausted to the surrounding environment of the apparatus may pose an unacceptable risk to human health or life, a gas filtration or air cleaning system is incorporated downstream of the nuclear fuel core or in combination with any cooling mechanisms (e.g., radiator, bypass(es), cooling pipes, etc.), filtering the exhaust gas prior to its exit from the apparatus. In some embodiments, the present apparatus comprises a filtration system located upstream of the inlet assembly. Such a filtration system may be needed in some environments to filter the ambient atmosphere prior to entering the inlet assembly in an open system embodiment (e.g., loitering or orbiting in the upper atmosphere or in surface applications on Mars or another planet).

In some embodiments, the rotating drive shaft can provide mechanical energy directly, such as to directly power an industrial motor. The use of such direct mechanical energy would avoid the energy losses from converting mechanical energy to electricity followed by converting it back to mechanical energy, as well as transmissions losses.

In some embodiments, the present apparatus can provide thermal energy. For instance, in certain embodiments, the present apparatus can generate thermal energy from the heated exhaust gas exiting the exhaust assembly (e.g., after passing the turbine(s)), from the heated gas exiting the one or more bypasses, from the heat extracted by any other cooling mechanisms (e.g., cooling pipes, vaporization, thermal radiation, conduction, etc.), or from combinations thereof.

Various embodiments of the apparatus are suitable to operate regardless of external environments (including, for example, on the Moon or other planets), and with or without utilizing the ambient gas in such environments as the system's operating gas. In some embodiments, the apparatus is designed to operate underground or underwater. For instance, in some embodiments, the apparatus can be submerged under water. Such underground or submerged configurations may provide safety and security benefits. Further, various embodiments of the present apparatus have significant potential for space power production due to its compactness, simple configuration, efficiency, and adaptability.

In some embodiments, two or more apparatuses could be sited at one location to share certain of the infrastructure and staffing at the location, as a multi-unit plant.

In some embodiments, the present apparatus includes a nuclear fuel core integrated with one or more components traditionally found in a jet engine (e.g., a turbofan or turbojet, as well as other types that may be later conceived or developed), the components adapted for such embodiments of the present apparatus. For instance, in some embodiments, diffusers, which may be found in some jet engines, are not needed as such diffusers may, instead, create drag by decreasing the velocity of the operating gas.

As shown herein, various embodiments of the present apparatus address significant challenges of gas transportation and cooling. Other apparatuses have been concerned with transportability of the apparatus, which means segmenting the components or modules for transportation purposes and ensuring that the modules meet dimensions of a cargo unit or trailer. As a result, the challenges of gas transportation and cooling cannot be adequately addressed within these prior configurations. Transporting some embodiments of the present apparatus is improved by controlling the pressure of the system, adding absorbers, and various other methods. For instance, in various embodiments, the containment vessel or the containment wall is installed onsite and then the gas propellant chamber is added thereto. In addition, various embodiments of the present apparatus utilizing the fully integrated approach allows for smaller dimensions than those of other transportable apparatuses if such other apparatuses were adapted to adequately address gas transportation and cooling.

Various and different embodiments of this disclosure are adaptable such that they are configured to provide certain functionality in various applications and/or to operate in various environments. In some embodiments, such functionality and/or deployment site characteristics warrant certain feature sets as described in this disclosure. For example, FIG. 1 illustrates a partial section view of a closed system nuclear power generation apparatus 100 in accordance with some embodiments discussed herein. Such embodiments can be deployed in a variety of environments. In a non-limiting exemplary example, the closed system nuclear power generation apparatus 100 of FIG. 1 is configured to operate in or adjacent to, for example, an industrial facility providing electrical power as well as process heat to the surrounding environment. Accordingly, the closed system nuclear power generation apparatus 100 of FIG. 1 ensures containment of the fissile material and operating gas in an environment potentially including humans where leaks may pose a risk, while using one or more heat exchangers 135 to assist in cooling the operating gas while also providing heat for a variety of functions of an industrial facility or process. Additionally, the expanding corkscrew-type turbine assembly 118, as further described in this disclosure, provides mechanical stability to the apparatus 100 while a partially integrated rotor/stator assembly 136, 137, 138 eliminates protrusion of the drive shaft 120 through the containment vessel 102. Such a partially integrated rotor/stator assembly 136, 137, 138 reduces the risk of leaking operating gas, in certain embodiments, thereby minimizing requirements for replenishment of the operating gas or use of a filtration system in the closed system as well as reducing concerns of radioactive gas leakage. Such a partially integrated rotor/ stator assembly 136, 137, 138 also promotes compactness which is beneficial for transportation and mobility of the apparatus 100.

This closed system nuclear power generation apparatus 100 of FIG. 1 comprises a containment vessel 102 housing a gas propellant chamber 126 which includes an inlet assembly 104, a nuclear fuel chamber 106, and an exhaust assembly 108. The containment vessel 102 also defines a circulation path 110 for the operating gas to circulate in the closed system. As shown in FIG. 1, in this embodiment, the inlet assembly 104 includes a compressor 112, such as the centrifugal compressor illustrated in FIG. 1, disposed in the inlet port or first end of the annular body of the gas propellant chamber 126. While depicted with a centrifugal compressor 112, a variety of configurations of a compressor are available and may be used without deviating from the intent of the present disclosure. For instance, in some larger embodiments, an axial compressor, such as the axial compressor 212 shown in FIG. 2 is used instead of the centrifugal compressor 112 shown in FIG. 1. The compressor 112 is connected via a drive shaft 120 to the downstream components, such as turbine assembly 118, as discussed below.

In the embodiment illustrated in FIG. 1, the inlet port of the annular body of the gas propellant chamber 126 has a cross section that decreases along the length of the inlet port where the compressor 112 is disposed. Such restriction in the cross section may help to compress the operating gas to be directed to the nuclear fuel chamber 106.

As further illustrated in FIG. 1, the nuclear fuel chamber 106 includes interior flow paths 115 disposed in a spiral or helical configuration such that the operating gas continues traveling in a spiral path after exiting the compressor 112. In particular, the nuclear fuel chamber 106 includes interior flow paths 115 adjacent to nuclear fuel elements 114 such that the operating gas continues traveling directionally in the spiral or helical path initiated by the compressor 112. Accordingly, any loss in rotational momentum due to the flow of the operating gas changing to a straight path may be mitigated. The spiral or helical flow paths 115 may minimize drag at the inlet and outlet of the nuclear fuel chamber 106 while also maintaining a spiral flow to optimize the speed and angle of impact of the operating gas when striking the turbine blades 118. FIG. 1 illustrates a section view to show the inside of the nuclear fuel core.

The spiral or helical configuration of the interior flow paths 115 allows the gas to spiral through the nuclear fuel chamber 106 to keep the gas moving through the apparatus. Such configuration may allow the interior flow paths 115 to more evenly distribute heat to operating gas. The spiral or helical configuration may also allow for a more compact nuclear fuel core while maintaining a long contact path between the operating gas and the fuel core. As shown in FIG. 1, the nuclear fuel chamber 106 includes interior flow paths 115 disposed in a spiral or helical configuration. In some embodiments, to form the spiral or helical flow paths 115, the nuclear fuel chamber 106 includes fuel elements 114 with helical groves, helically shaped elements with gas passages, graphite or metal blocks with helical passages, or imbedded fuel as well as a liquid fuel tank with helical pipes following the needed flow shape. Various methods of forming the spiral or helical flow paths 115 can be implemented taking advantage of all reactor core designs and developing new reactor core designs—e.g., molten salt cores and solid cores. While depicted with interior flow paths 115 disposed in the spiral or helical configuration, variations on the configuration of the nuclear fuel elements 114, flow paths 115, and nuclear fuel chamber 106 are available, such as the configurations depicted in FIGS. 2 and 3, and can be used without deviating from the intent of the present disclosure. Additionally or alternatively, the nuclear fuel chamber 106 can be configured to be a rotating nuclear fuel chamber in certain embodiments, such that the nuclear fuel chamber rotates (e.g., flywheel effect) as described in more detail with respect to FIG. 5. Such an rotating nuclear fuel chamber embodiment may be used in a limited gravity environment such as on the lunar surface or in space travel.

In the embodiment illustrated in FIG. 1, the outlet of the nuclear fuel chamber is configured such that the nuclear fuel chamber (e.g., the nuclear fuel core) includes an indentation or recessed conical shape. In certain embodiments, the indentation in the fuel core optimizes the exiting flow path of the operating gas as it exits the outlet of the nuclear fuel chamber 106 and strikes the turbine assembly 118. The indentation may also assist in cooling and managing the higher core temperatures of the nuclear fuel chamber 106. While depicted with the indented conical shape of the outlet of the nuclear fuel chamber 106, not all applications would require such indentation. Further, although not depicted in FIG. 1, additionally or alternatively, in some embodiments, the inlet of the nuclear fuel chamber (e.g., the nuclear fuel core) includes an indentation or recessed conical shape. In such embodiments, the indentation coincides with the entrance of the elongated flow paths 115 to optimize the vector of the operating gas flow entering the nuclear fuel core. In some embodiments, the geometry of one or both of the indentation(s) is modified as needed to achieve this and other benefits or eliminated in certain configurations to achieve other benefits.

Further to the embodiment illustrated in FIG. 1, an exterior bypass 130 is disposed between the gas propellant chamber 126 and the inner wall 128 of the containment vessel 102 and an interior bypass 140 is disposed between the nuclear fuel core of the nuclear fuel chamber 106 and the inner surface of the gas propellant chamber 126. As illustrated in the embodiment in FIG. 1, some embodiments of the apparatus incorporates a circulation fan 132 added upstream of the compressor 112 and the bypasses 130, 140 to further direct or force the operating gas into the gas propellant chamber 126 and/or either or both of the bypasses 130, 140. In some embodiments, the bypasses 130, 140 are enlarged. The bypasses 130, 140 may allow for cooling of the nuclear fuel chamber 106 and thus regulation of nuclear fuel chamber 106 to avoid overheating of the nuclear power generation apparatus 100. The bypasses 130, 140 may be modified as needed to achieve this and other benefits or eliminated in certain configurations to achieve other benefits. While depicted with both an exterior bypass 130 and an interior bypass 140 in the exemplary industrial facility environment, not all applications would require such bypasses. For instance, in some closed system embodiments, it may be desired to eliminate either or both of the bypasses 130, 140 if such bypasses are not necessary to facilitate the flow of the operating gas through the system or to cool the nuclear fuel chamber 106.

As illustrated in the embodiment in FIG. 1, the exhaust assembly 108 includes a nozzle 116. As depicted, in some embodiments, the exhaust assembly 108 includes all or a portion of a turbine assembly 118. The nozzle 116 forms the exhaust port or the second end of the annular body of the gas propellant chamber 126. The nozzle 116 may restrict the flow area of the operating gas to increase the velocity of the gas. The flow of the operating gas exiting the nuclear fuel chamber 106 drives the turbine assembly 118.

As shown in FIG. 1, the turbine blades of the turbine assembly 118 are arranged in an expanding corkscrew-type configuration. Such expanding corkscrew-type turbine blade configuration improves the efficiency of the apparatus 100 in some embodiments by taking advantage of the angle at which the operating gas exits the nuclear fuel chamber 106 (e.g., in a spiral path flow when exiting a spiral or helical fuel core) and facilitates dispersion of the operating gas into the expanded area of the circulation path 110 defined by the containment vessel 102 after the flow of the operating gas strikes the turbine assembly 118. The turbine assembly 118 is rotationally connected to the compressor 112 by the drive shaft 120 and is driven by the rotation of the drive shaft 120. In some embodiments, the corkscrew-type turbine assembly 118 better distributes the resulting mechanical forces and thermal stresses along the drive shaft 120. For instance, in an embodiment in which the nuclear power generation apparatus 100 is utilized in an environment that is remote, not easily accessible, and/or inaccessible (e.g., on a submarine, in space, upper atmosphere, other planets, etc.), such distribution of resulting mechanical forces and thermal stresses along the drive shaft reduces the potential need for corrective intervention due to such stresses.

Variations on the configuration of the turbine assembly 118 are available, such as the configurations depicted in FIGS. 2-7, and may be used without deviating from the intent of the present disclosure. For instance, in some embodiments, although not depicted in FIG. 1, at least one turbine blade array of a turbine assembly can be disposed in line with the exit of the nozzle 116. In some embodiments, the at least one turbine blade array of the turbine assembly 118 spans partially, or alternatively, entirely, the inner circumference of the opening of the nozzle 116 at the point where the operating gas contacts the blades, depending on the specific configuration of the blades, the specific configuration of the apparatus and its other components and the specific gas transportation requirements of the specific apparatus configuration. Such positioning of the turbine assembly 118 in line with the nozzle 116 may decrease the size of the apparatus allowing for a more compact design and may improve the efficiency of the apparatus in some embodiments. In other embodiments, for example, one or more blade arrays are positioned downstream of the nozzle 116 and such blades of the turbine assembly span partially, or alternatively entirely, the inner circumference of the containment vessel (e.g., in a closed system) or the containment wall (e.g., in an open system) at the point where the operating gas contacts the blades of the turbine assembly. In still further embodiments, as depicted in FIGS. 2 and 7, the turbine assembly is a shortened turbine blade array disposed proximate to the inner surface of the outer wall of the containment vessel, which may provide greater drive shaft stability and provide an even more compact overall design, allowing the apparatus 100 to be used in a more confined environment.

Further to the embodiment illustrated in FIG. 1, the turbine assembly 118 is also connected to a rotor/stator assembly 136, 137, 138 partially integrated with the outer wall of the containment vessel 102. In some embodiments, the partially integrated rotor/stator assembly 136, 137, 138 reduces the potential for leaking operating gas due to a protruding drive shaft and/or an external generator, which is a design consideration for a variety of applications, including for example, proximity to humans (e.g., radioactive concerns) and remote deployments, such as space applications, remote terrestrial sites, lunar sites, etc., where adequate supply of operating gas replenishment may not be feasible.

As illustrated in FIG. 1, the expanding corkscrew-type turbine blade 118 is optionally connected to shielding 180 (e.g., heat, radioactive, etc.), the shielding 180 coupled to and protecting a rotor 136 from the heat and/or radiation of the operating gas. In other embodiments, the expanding corkscrew-type turbine blade 118 is connected directly (not shown) to the rotor 136. In other embodiments, a gear box is interposed between the turbine assembly 118 and the rotor 136 to reduce or increase the angular velocity of the drive shaft 120 at the point it is coupled to the rotor 136 and, optionally, supporting beams or other supports are attached to the gear box, or to the drive shaft 120 in the vicinity of the gear box, to stabilize and otherwise support the drive shaft 120.

In the embodiment illustrated in FIG. 1, the rotor 136 is in communication with a stator 138. In some embodiments, as depicted, a high performance bearing 137, such as a magnetic bearing, interfaces between the rotor 136 and the outer wall of the containment vessel 102. In some embodiments, there is no penetration of the outer wall of the containment vessel 102 between the rotor 136 and stator 138. In some embodiments, as illustrated in FIG. 1, the surface of the containment vessel 102 is not curved or bowed at the location of the partially integrated rotor/stator assembly 136, 137, 138 to facilitate engagement of the assembly. In still further embodiments, the containment vessel 102 is thicker (e.g., built up in the vicinity of the rotor/stator assembly 136, 137, 138) and/or includes bearings, beams, and/or other support or reinforcement to support the rotor/stator assembly 136, 137, 138 and the drive shaft 120. In certain embodiments, a portion of the inner surface of the containment vessel 102 adjoining the rotor 136 and high performance bearing 137 is recessed or sunken to allow all or a portion of the rotor 136 and the high performance bearing 137 to be partially or fully recessed within the outer wall of the containment vessel 102. Additionally or alternatively, a portion of the inner surface of the containment vessel 102 adjoining the rotor 136 and high performance bearing 137 incorporates a taper-shaped cone to stabilize the drive shaft and turbine if the rotor and high performance bearing are shaped to conform and fit within the cone. Details of such a taper-shaped cone is provided in FIG. 8B. In some embodiments, the taper-shaped cone is truncated. In still further embodiments, the taper-shaped coned includes additional bearings. Additionally or alternatively, in some embodiments, the rotor 136 and/or the bearing 137 is wholly or partially surrounded by a reinforced lip incorporated in the outer wall of the containment vessel 102. The stator 138 is connected to the exterior of the containment vessel 102 and is stationary as the rotor 136 rotates with the turbine assembly 118.

As illustrated in FIG. 1, in some embodiments, the drive shaft 120 extends the entire length of the containment vessel 102 and is supported at both ends of the containment vessel 102. Although not depicted, in some embodiments, the drive shaft 120 is supported by one or more additional bearings and/or beams. By extending the entire length of the containment vessel 102 and/or being supported at both ends, the drive shaft 120 may increase stability and/or reduce vibrations within closed system embodiments. In various embodiments, the length of the drive shaft 120 is modified (e.g., reduced and/or further stabilized) as needed to achieve this and/or other benefits in certain configurations. In the embodiment illustrated in FIG. 1, the compressor 112, turbine assembly 118, and rotor 136 rotate along the same axis. However, in other embodiments, one or more of the components rotate along a different axis.

After the operating gas strikes the turbine assembly 118, it is dispersed into the containment vessel 102 for traveling along circulation path 110 back to the inlet assembly 104. As shown in FIG. 1, downstream of the gas propellant chamber 126, the containment vessel 102 widens allowing for a reduction in pressure and temperature in the operating gas. That is, the circulation path 110 defined by the containment vessel 102 has a first diameter and a second diameter, the second diameter being larger than the first diameter and disposed downstream of the first diameter. In particular, the significant expansion and reduction in pressure of the operating gas after it passes the turbine assembly 118 and is dispersed into the significantly greater volume of the containment vessel 102 may assist in cooling of the operating gas.

In the embodiment illustrated in FIG. 1, the containment vessel 102 includes one or more heat exchangers 135 disposed along the circulation path 110 for process heat and to efficiently cool the operating gas prior to re-entry into the inlet assembly 104. It may be beneficial to include heat exchangers 135 for process or district heat in cases where the operating gas is not inert or the containment vessel 102 is a closed vessel as illustrated in FIG. 1. The heat exchangers 135 may also aid in cooling the gas as it circulates. While depicted with a heat exchanger 135 in an exemplary industrial environment, not all applications, industrial or otherwise, would need such heat exchangers. In some embodiments, a heat exchanger 135 is not used. Various modifications can be made without deviating from the intent of the present disclosure.

In some embodiments, the containment vessel 102 includes one or more other components to cool the gas, such as the wall(s) of the containment vessel 102 being cooled externally, one or more cooling pipe(s), or a combination thereof as well as other cooling mechanisms. For instance, in some embodiments, accessibility of sufficient water at a deployment site provides support for additional and/or other cooling options, such as cooling pipe(s). In still further embodiments, the outer wall of the containment vessel 102 is of a double-wall construction with a cooling mechanism, such as a heat exchanger or coolant, being present within the double-wall construction. In some embodiments, the pressure of the area between the double-wall construction is different than the pressure of the circulation path 110. For instance, in some embodiments, the double-wall construction comprises an inner containment vessel layer and an outer containment vessel layer, with a region defined therebetween the vessel layers, and, in some further embodiments, a cooling mechanism and/or vacuum disposed between the two vessel layers. Various modifications can be made without deviating from the intent of the present disclosure.

Many of the features of the embodiment of FIG. 1 are discussed with respect to the apparatus 100 being deployed at an industrial facility site providing electrical power as well as process heat to the surrounding environment. Such exemplary use and deployment environment are non-limiting examples and various modifications and uses can be made without deviating from the intent of the present disclosure.

As described with respect to FIG. 1, various and different embodiments of this disclosure are adaptable such that they are configured to provide certain functionality in various applications and/or to operate in various environments. For example, FIG. 2 illustrates a partial section view of a closed system nuclear power generation apparatus 200 in accordance with some embodiments discussed herein. Like the closed system nuclear power generation apparatus 100 of FIG. 1, the closed system nuclear power generation apparatus 200 of FIG. 2 ensures containment of the fissile material and operating gas in an environment potentially including humans or other life where leaks may pose a risk. Like the apparatus 100, the apparatus 200 includes a partially integrated rotor/stator assembly 236, 237, 238 which generates electricity while promoting compactness and eliminating protrusion of the drive shaft 220 through the containment vessel 202. Such a partially integrated rotor/stator assembly 236, 237, 238 reduces the potential risk of leaking operating gas in certain embodiments, thereby minimizing requirements for replenishment of the operating gas (e.g., which may be difficult in remote deployments) or use of a filtration system in the closed system as well as reducing concerns of radioactive gas leakage. Additionally, the compact turbine assembly 218, as further described in this disclosure, provides a more compact design for even more confined deployment spaces. Such a compact design is beneficial for transportation and mobility of the apparatus 200. In addition, the apparatus 200 may more readily incorporate nuclear fuel elements in more conventional arrangements (e.g., arranged in longitudinal and straight interior flow paths), including enhancements and improvements to such elements.

In particular, FIG. 2 illustrates a closed system nuclear power generation apparatus 200 comprising a containment vessel 202 housing a gas propellant chamber 226 which includes an inlet assembly 204, nuclear fuel chamber 206, and exhaust assembly 208. The containment vessel 202 also defines a circulation path 210 for the operating gas to flow in the closed system nuclear power generation apparatus 200. As shown in FIG. 2, in this embodiment, the inlet assembly 204 includes a compressor 212, such as an axial compressor as illustrated in FIG. 2, disposed in the inlet port or first end of the annular body of the gas propellant chamber 226. A variety of configurations of a compressor are available and may be used without deviating from the intent of the present disclosure. For example, a centrifugal compressor, as depicted in FIGS. 1 and 3-6, may be simpler, lighter weight, and provide for a larger intake to facilitate gas flow. The compressor 212 is connected via a drive shaft 220 to the downstream components, such as turbine assembly 218 discussed below.

In the embodiment illustrated in FIG. 2, the inlet port of the annular body of the gas propellant chamber 226 has a cross section that decreases along the length of the inlet port where the compressor 212 is disposed. Such restriction in the cross section may help to compress the operating gas to be directed to the nuclear fuel chamber 206.

Further to the embodiment illustrated in FIG. 2, the nuclear fuel chamber 206 includes nuclear fuel elements 214 with flow paths 215 showing the flow of operating gas around and between the nuclear fuel elements 214. While depicted with such longitudinal and straight interior flow paths 215 and nuclear fuel elements 214, variations on the configuration of the nuclear fuel elements 214, flow paths 215, and nuclear fuel chamber 206 are available, such as the configurations depicted in FIGS. 1, 3, and 4, and may be used without deviating from the intent of the present disclosure. For example, in some embodiments, the nuclear fuel elements are configured such that the operating gas flows around the elements, instead of between elements. Further, in some embodiments, the nuclear fuel elements are arranged in a fuel element lattice (i.e., fuel elements arrayed in a geometric matrix), such as the lattice depicted in FIG. 3, designed to optimize the operating parameters desired for the apparatus. In certain embodiments, flow channels for the operating gas extend through the lattice. Additionally or alternatively, the nuclear fuel chamber 206 can be configured to be a rotating nuclear fuel chamber in certain embodiments, such that the nuclear fuel chamber rotates (e.g., flywheel effect) as described in more detail with respect to FIG. 5. Such an rotating nuclear fuel chamber embodiment may be used in a limited gravity environment such as on the lunar surface or in space travel.

As discussed in the description of FIG. 1 and as illustrated in FIG. 2, an exterior bypass 230 is disposed between the gas propellant chamber 226 and the inner wall 228 of the containment vessel 202 and an interior bypass 240 is disposed between the nuclear fuel core of the nuclear fuel chamber 206 and the inner surface of the gas propellant chamber 226. While depicted with both an exterior bypass 230 and an interior bypass 240 in the exemplary submarine environment, not all applications would require such bypasses. In some embodiments, the bypasses 230, 240 are enlarged, utilized in connection with an optional circulation fan 232 upstream of the compressor 212, and/or are otherwise modified as needed to achieve cooling benefits or eliminated in certain configurations to achieve other benefits.

As illustrated in FIG. 2, the exhaust assembly 208 includes a nozzle 216 and a turbine assembly 218. The nozzle 216 forms the exhaust port or the second end of the annular body of the gas propellant chamber 226. In some embodiments, the nozzle 216 restricts the flow area of the operating gas to increase the velocity of the gas. As shown in FIG. 2, the turbine blade array of the turbine assembly 218 is located downstream of the nozzle 216, the shortened turbine blade array protruding radially outward from the drive shaft 220, the radial extent of the turbine blade array increasing along the length of the drive shaft 220 proximate to the rotor/stator assembly 236, 237, 238. Variations on the configuration of the turbine assembly 218 are available, such as the configurations depicted in FIGS. 1, 3, and 4, and may be used without deviating from the intent of the present disclosure. For example, the location of the blades of the turbine assembly 218 in relationship to the outlet or nozzle 216 of the nuclear fuel chamber 206 may be determined by several parameters, such as the velocity and temperature of the operating gas at certain distances from the outlet or nozzle 216 of the nuclear fuel chamber 206. For instance, in some embodiments, the turbine assembly 218 includes a first turbine in line with the exit of the nozzle 216 and a second turbine further downstream from the nozzle 216, both turbines being connected to the shaft 220, which is connected upstream to the inlet assembly components. In the embodiment illustrated in FIG. 2, the compressor 212 is rotationally connected to the turbine assembly 218 by the drive shaft 220 and is driven by the rotation of the drive shaft 220.

In FIG. 2, the turbine assembly 218 is also connected to a partially integrated rotor/stator assembly 236, 237, 238 via the drive shaft 220, the rotor/stator assembly 236, 237, 238 similar to the rotor/stator assembly illustrated in FIG. 1. Details of the partially integrated rotor/stator assembly of FIG. 2 is provided in FIG. 8A. In some embodiments, the rotor/stator assembly 236, 237, 238 is partially integrated with the outer wall of the containment vessel 202. In the embodiment illustrated in FIG. 2, the rotor 236 is coupled to the drive shaft 220, the drive shaft 220 supported by, but not penetrating, the outer wall of the containment vessel 202. The rotor 236 is in communication with a stator 238 by way of a high performance bearing 237, such as a magnetic bearing. The stator 238 is connected to the exterior of the containment vessel 202 and is stationary as the rotor 236 rotates with the turbine assembly 218. In certain embodiments, shielding 280 is optionally coupled to and protects the rotor 236 from the heat and radiation of the operating gas exiting the nozzle 216 and being dispersed from the turbine assembly 218.

As illustrated in FIG. 2, the drive shaft 220 extends the entire length of the containment vessel 202 and is supported at both ends of the containment vessel 202, thereby a means to support the drive shaft 220. Although not depicted, in some embodiments, the drive shaft 220 is supported by additional bearings and/or beams. As shown in FIG. 2, the compressor 212, turbine assembly 218, and rotor 236 rotate along the same axis. However, in other embodiments, one or more of the components rotate along a different axis.

Further to the embodiment illustrated in FIG. 2, the containment vessel 202 includes one or more cooling pipes 245 disposed along the circulation path 210 for cooling the operating gas prior to re-entry into the inlet assembly 104. For example, in certain submarine deployments, wherein the apparatus 200 provides electrical power for use on board a submarine, one or more cooling pipes 245 are configured with adequate water supply to assist in cooling the apparatus 200. FIG. 2 illustrates one configuration of the cooling pipes 245, however, various configurations are available without deviating from the intent of the present disclosure. For instance, in some embodiments, one or more cooling pipes 245 are disposed in smaller sections or multiple sections along the circulation path 210 to improve the cooling and gas transportation of the operating gas through the apparatus 200. While depicted with a plurality of cooling pipes 245 in the exemplary environment of a submarine, not all applications, submarine or otherwise, would require such cooling pipes. In some embodiments, cooling pipes 245 are not used. Various modifications can be made without deviating from the intent of the present disclosure.

In some embodiments, the containment vessel 202 includes other components to cool the gas, such as the wall(s) of the containment vessel 202 being cooled externally, one or more heat exchangers(s) (e.g., similar to the heat exchangers 135 disposed along the circulation path 110 in FIG. 1), or a combination thereof as well as other cooling mechanisms. Various modifications can be made without deviating from the intent of the present disclosure.

Some of the features of the embodiment of FIG. 2 are discussed with respect to the apparatus 200 being deployed in a submarine providing electrical power for use on board the submarine. Such exemplary use and deployment environment are non-limiting examples and various modifications and uses can be made without deviating from the intent of the present disclosure.

As described with respect to FIGS. 1 and 2, various and different embodiments of this disclosure are adaptable such that they are configured to provide certain functionality in various applications and/or to operate in various environments. For example, FIG. 3 illustrates a partial section view of a closed system nuclear power generation apparatus 300 in accordance with some embodiments discussed herein. Like the closed system nuclear power generation apparatuses 100, 200 of FIGS. 1 and 2, the closed system nuclear power generation apparatus 300 of FIG. 3 ensures containment of the fissile material and operating gas in an environment potentially including humans or other life where leaks may pose a risk. Like the apparatuses 100, 200, the apparatus 300 includes a partially integrated rotor/stator assembly 336, 337, 338 which generates electricity while promoting compactness and eliminating protrusion of the drive shaft 320 through the containment vessel 302. Such a partially integrated rotor/stator assembly 336, 337, 338 reduces the potential risk of leaking operating gas in certain embodiments, thereby minimizing requirements for replenishment of the operating gas (e.g., which may be difficult in remote deployments) or use of a filtration system in the closed system as well as reducing concerns of radioactive gas leakage. Additionally, the positioning of the turbine assembly 318 in line with the nozzle 316 also provides for a more compact design. Such compactness due to the design of the components is beneficial for transportation and mobility of the apparatus 300.

FIG. 3 illustrates a closed system nuclear power generation apparatus 300 comprising a containment vessel 302 housing a gas propellant chamber 326 which includes an inlet assembly 304, nuclear fuel chamber 306, and exhaust assembly 308. The containment vessel 302 also defines a circulation path 310 for the operating gas to flow in the closed system nuclear power generation apparatus 300. As shown in FIG. 3, in this embodiment, the inlet assembly 304 includes a compressor 312, such as a centrifugal compressor as illustrated in FIG. 3, disposed in the inlet port or first end of the annular body of the gas propellant chamber 326. A variety of configurations of a compressor are available, for example, the axial compressor depicted in FIG. 2, and may be used without deviating from the intent of the present disclosure. A centrifugal compressor may be simpler, lighter weight, and provide a larger intake to facilitate gas flow. Similar to the embodiment illustrated in FIG. 2, the inlet port of the annular body of the gas propellant chamber 326 of the embodiment depicted in FIG. 3 has a cross section that decreases along the length of the inlet port where the compressor 312 is located and the embodiment further optionally includes a circulation fan 332, as depicted in dashed line in FIG. 3. The compressor 312 is connected via drive shaft 320 to the downstream components, such as turbine assembly 318.

In the embodiment illustrated in FIG. 3, the compressor 312 is also connected via drive shaft 320 to upstream component(s), such as the partially integrated rotor/stator assembly 336, 337, 338. The rotor/stator assembly 336, 337, 338 of FIG. 3 is similar to the rotor/stator assemblies illustrated in FIGS. 1 and 2, however, the rotor/stator assembly is partially integrated with the outer wall of the containment vessel 302 proximate to the inlet assembly 304 of the gas propellant chamber 326 instead of proximate the exhaust assembly 308. As illustrated in FIG. 3, in some embodiments, shielding 380 is coupled to and protects the rotor 336 from the heat and/or radiation of the operating gas in the circulation path 310. As further illustrated in FIG. 3, in some embodiments, the shielding 380 includes fins, blades, or fan-like structures to assist in circulation of the operating gas, including in the direction of the inlet assembly 304. In the embodiment illustrated in FIG. 3, the rotor 336 is coupled directly to the drive shaft 320 and is in communication with a stator 338. In some embodiments, as depicted in FIG. 3, a high performance bearing 337, such as a magnetic bearing, interfaces between the rotor 336 and the outer wall of the containment vessel 302. In certain embodiments, there is no penetration of the outer wall of the containment vessel 302. In further embodiments, the exterior and/or interior surfaces of the containment vessel 302 are not curved or bowed at the location of the partially integrated rotor/stator assembly 336, 337, 338 to facilitate engagement of the assembly. In still further embodiments, the containment vessel 302 is thicker or built up in the vicinity of the rotor/stator assembly 336, 337, 338 and/or includes bearings, beams, and other support or reinforcement to support the rotor/stator assembly 336, 337, 338 and the drive shaft 320. A portion of the inner surface of the containment vessel 302 adjoining the rotor 336 and high performance bearing 337 may be recessed or sunken to allow all or a portion of the rotor 336 and the high performance bearing 337 to be partially or fully recessed within the outer wall of the containment vessel 302. Additionally or alternatively, in some embodiments, the rotor 336 and/or the bearing 337 is wholly or partially surrounded by a reinforced lip incorporated in the outer wall of the containment vessel 302. The stator 338 is connected to the exterior of the containment vessel 302 and is stationary as the rotor 336 rotates with the drive shaft 320. In some embodiments, the apparatus 300 provides a more compact design for even more confined deployment spaces and may be more adaptable to incorporating fuel elements in a geometric matrix, including enhancement and improvements to such elements.

In the embodiment illustrated in FIG. 3, the nuclear fuel chamber 306 includes nuclear fuel elements 314 arranged in a fuel element lattice (i.e., fuel elements arrayed in a geometric matrix) with flow paths 315 around the elements 314. In certain embodiments, flow channels for the operating gas extend through the lattice. Variations on the configuration of the nuclear fuel elements 314, flow paths 315, and nuclear fuel chamber 306 are available, such as the configurations depicted in FIGS. 1, 2, and 4, and may be used without deviating from the intent of the present disclosure. Additionally or alternatively, the nuclear fuel chamber 306 can be configured to be a rotating nuclear fuel chamber in certain embodiments, such that the nuclear fuel chamber rotates (e.g., flywheel effect) as described in more detail with respect to FIG. 5. Such an rotating nuclear fuel chamber embodiment may be used in a limited gravity environment such as on the lunar surface or in space travel.

Further to the embodiment illustrated in FIG. 3, an exterior bypass 330 is disposed between the gas propellant chamber 326 and the inner wall 328 (e.g., the inner wall 328 forming an annular cavity surrounding at least a portion of the gas propellant chamber 326) of the containment vessel 302 and an interior bypass 340 is disposed between the nuclear fuel core of the nuclear fuel chamber 306 and the inner surface of the gas propellant chamber 326. In some embodiments, the bypasses 330, 340 are enlarged. As illustrated in the embodiment in FIG. 3, in certain embodiments, the apparatus 300 utilizes a circulation fan 332 added upstream of the compressor 312 and the bypasses 330, 340 to further direct or force the operating gas into the gas propellant chamber 326 and/or either or both of the bypasses 330, 340. In various embodiments, the bypasses 330, 340 allow for cooling of the nuclear fuel chamber 306 and thus regulation of nuclear fuel chamber 306 to avoid overheating of the nuclear power generation apparatus 300. The bypasses 330, 340 may be modified as needed to achieve this and other benefits or eliminated in certain configurations to achieve other benefits.

As shown in FIG. 3, in this embodiment, the exhaust assembly 308 includes a nozzle 316 and a turbine assembly 318 in line with the exit of the nozzle 316. In some embodiments, such positioning of the turbine assembly 318 in line with the nozzle 316 decreases the size of the apparatus 300 allowing for a more compact design and, additionally or alternatively, in some embodiments, improves the efficiency of the apparatus 300. The nozzle 316 forms the exhaust port or the second end of the annular body of the gas propellant chamber 326. In some embodiments, as depicted in FIG. 3, the nozzle 316 restricts the flow area of the operating gas to increase the velocity of the gas. The flow of the operating gas exiting the nuclear fuel chamber 306 drives the turbine assembly 318. In various embodiments, magnetic bearings or other high-performance bearings are utilized to minimize the surface friction at the base of the blade assemblies (e.g., spinning blades) of the turbine assembly 318 and to maximize the angular velocity of the blades. The turbine assembly 318 is rotationally connected to the compressor 312 by the drive shaft 320 and is driven by the rotation of the drive shaft 320. Variations on the configuration of the turbine assembly 318 are available, such as the configurations depicted in FIGS. 1, 2, and 4, and may be used without deviating from the intent of the present disclosure. For instance, in some embodiments, the blades of the turbine assembly 318 span partially, or alternatively, entirely, the inner circumference of the opening of the nozzle 316 at the point where the operating gas contacts the blades, depending on the specific configuration of the blades, the specific configuration of the apparatus 300 and its other components and the specific gas transportation requirements of the specific apparatus configuration. In other embodiments, for example, the turbine assembly 318 includes a first turbine in line with the exit of the nozzle 316 and a second optional turbine further downstream from the nozzle 316, as depicted by the additional optional blade array 318 in dashed line in FIG. 3, both turbines being connected to the drive shaft 320, which is connected upstream to the inlet assembly components. In some embodiments, one or more blade arrays are positioned downstream of the nozzle. In certain embodiments, such blades of the turbine assembly 318 span partially, or alternatively entirely, the inner circumference of the containment vessel 302 (e.g., in a close system) or the containment wall (e.g., in an open system) at the point where the operating gas contacts the blades of the turbine assembly.

As illustrated in FIG. 3, in some embodiments, the drive shaft 320 extends to the turbine assembly 318 and is supported at only one end of the containment vessel 302. However, in some embodiments, the drive shaft 320 extends the entire length of the containment vessel 302 and is supported at both ends of the containment vessel 302, as indicated by the dashed lines. As shown in FIG. 3, the compressor 312, turbine assembly 318, and rotor 336 rotate along the same axis. However, in other embodiments, one or more of the components rotate along a different axis.

As described with respect to FIGS. 1-3, various and different embodiments of this disclosure are adaptable such that they are configured to provide certain functionality in various applications and/or to operate in various environments. For example, FIG. 4 illustrates a partial section view of another closed system nuclear power generation apparatus 400 in accordance with some embodiments discussed herein. The closed system nuclear power generation apparatus 400 of FIG. 4 ensures containment of the fissile material and operating gas, while generating electricity via one or more generators 422 integrated within a cavity of the apparatus 400. Such configuration reduces risk to humans or other living things in proximity to the deployment of the apparatus 400, wherein any operating gas leak potentially occurring due to the protrusion into the inner cavity still remains contained within the vessel 402.

In particular, FIG. 4 illustrates a closed system nuclear power generation apparatus 400 comprising a containment vessel 402 housing a gas propellant chamber 426 which includes an inlet assembly 404, nuclear fuel chamber 406, and exhaust assembly 408. The containment vessel 402 also defines a circulation path 410 for the operating gas to flow in the closed system nuclear power generation apparatus 400. As shown in FIG. 4, in this embodiment, the inlet assembly 404 includes a compressor 412, such as a centrifugal compressor as illustrated in FIG. 4, disposed in the inlet port or first end of the annular body of the gas propellant chamber 426. A variety of configurations of a compressor are available and may be used without deviating from the intent of the present disclosure. For example, in some embodiments, an axial compressor, as depicted in FIG. 2, is used. The compressor 412 is connected via a drive shaft 420 to the downstream components, such as turbine assembly 418, and to upstream components, such as a circulation fan 432.

In the embodiment illustrated in FIG. 4, the inlet port of the annular body of the gas propellant chamber 426 has a cross section that decreases along the length of the inlet port where the compressor 412 is located and the embodiment further includes an exterior bypass 430, an interior bypass 440, and an exhaust assembly 408 including a nozzle 416 and a turbine assembly 418. In the embodiment illustrated in FIG. 4, the nuclear fuel chamber 406 includes interior flow paths 415 disposed in a spiral or helical configuration such that the operating gas continues traveling in a spiral path after exiting the compressor 412. In particular, the nuclear fuel chamber 406 includes interior flow paths 415 adjacent to nuclear fuel elements 414 such that the operating gas continues traveling directionally in the spiral or helical path initiated by the compressor 412. Variations on the configuration of the nuclear fuel elements 414, flow paths 415, and nuclear fuel chamber 406 may be available, such as the configurations depicted in FIGS. 1, 2, and 3, without deviating from the intent of the present disclosure. Additionally or alternatively, the nuclear fuel chamber 106 can be configured to be a rotating nuclear fuel chamber in certain embodiments, such that the nuclear fuel chamber rotates (e.g., flywheel effect) as described in more detail with respect to FIG. 5. Such a rotating nuclear fuel chamber embodiment may be used in a limited gravity environment such as on the lunar surface or in space travel.

In the embodiment illustrated in FIG. 4, at least one generator 422 is disposed such that the generator 422 rotates along a different axis than the rotational drive shaft 420 extending through the apparatus 400, the generator 422 disposed in a cavity annularly surrounding the gas propellant chamber 426, such cavity being formed by the inner wall 428 of the containment vessel 402. In particular, the drive shaft 420 includes a gear box or couplings 475, allowing the at least one generator 422 to be placed on an axis perpendicular, or at another angle, to the drive shaft 420 via a separate transmission shaft connected to the gear box or other couplings 475. In the embodiment illustrated in FIG. 4, the gear box 475 is attached to the drive shaft 420 at a location upstream of the compressor 412 and downstream of the circulation fan 432, however, the containment vessel 402 could be configured to place the generator 422 upstream of the circulation fan 432 or the circulation fan 432 could be removed, without deviating from the intent of the present disclosure. A seal 470 is disposed at the junction of the rod through the wall separating the enclosed cavity from the containment vessel 402, the seal 470 minimizing or otherwise sufficiently preventing the passage or leakage of the operating gas into the enclosed cavity. This internal placement of the generator may be desirable for cogeneration (heat and electricity) applications, especially for high temperature process heat, to provide the generator additional shielding from the temperatures in the containment vessel 402.

As shown in FIG. 4, in this embodiment, the exhaust assembly 408 includes a nozzle 416 and a turbine assembly 418 in line with the exit of the nozzle 416. Such positioning of the turbine assembly 418 in line with the nozzle 416 may decrease the size of the apparatus 400 allowing for a more compact design and may improve the efficiency of the apparatus 400 in some embodiments. The nozzle 416 forms the exhaust port or the second end of the annular body of the gas propellant chamber 426. As depicted, the nozzle 416 restricts the flow area of the operating gas to increase the velocity of the gas. The flow of the operating gas exiting the nuclear fuel chamber 406 drives the turbine assembly 418. In various embodiments, magnetic bearings or other high-performance bearings are utilized to minimize the surface friction at the base of the blade assemblies (e.g., spinning blades) of the turbine assembly 418 and to maximize the angular velocity of the blades. The turbine assembly 418 is rotationally connected to the compressor 412 by the drive shaft 420 and is driven by the rotation of the drive shaft 420. Variations on the configuration of the turbine assembly 418 are available, such as the configurations depicted in FIGS. 1, 2, and 3, and may be used without deviating from the intent of the present disclosure. For instance, in some embodiments, the blades of the turbine assembly 418 span partially, or alternatively, entirely, the inner circumference of the opening of the nozzle 416 at the point where the operating gas contacts the blades, depending on the specific configuration of the blades, the specific configuration of the apparatus 400 and its other components and the specific gas transportation requirements of the specific apparatus configuration.

As illustrated in FIG. 4, in some embodiments, the drive shaft 420 extends from the circulation fan 432 to the turbine assembly 418. In certain embodiments, the drive shaft 420 is connected to and supported by two or more bearings and beams (or other support members) 460a, 46b. However, in some embodiments, the drive shaft 420 extends the entire length of the containment vessel 402 and is supported at one or both ends of the containment vessel 402, as indicated by the dashed lines. As shown in FIG. 4, the compressor 412, turbine assembly 418, and circulation fan 436 rotate along the same axis. However, like the generator 422, in other embodiments, one or more of the components rotate along a different axis.

As described with respect to FIGS. 1-4, various and different embodiments of this disclosure are adaptable such that they are configured to provide certain functionality in various applications and/or to operate in various environments. For example, FIG. 5 illustrates a partial section view of another closed system nuclear power generation apparatus 500 in accordance with some embodiments discussed herein. The closed system nuclear power generation apparatus 500 of FIG. 5 ensures containment of the fissile material and operating gas, potentially reducing risk to humans or other living things in proximity to the deployment of the apparatus 500. The compact closed system apparatus 500 depicted in FIG. 5 is designed, in certain embodiments, to generate electricity via the rotor/stator belt assembly 518, 538 integrated within the turbine assembly 518 and nozzle 516, the integrated rotor/stator belt assembly 518, 538 reducing energy losses and increasing efficiency in certain embodiments. The closed system apparatus 500 depicted in FIG. 5 is designed, in certain embodiments, to be incorporated in a space craft (e.g., a rocket or a shuttle for cis-lunar space), the electricity generated by the integrated rotor/stator assembly 518, 538 of the nuclear power generation apparatus 500 being used, for example, for nuclear electric propulsion in space (e.g., for driving or powering ion thrusters or other electrical propulsion technology). In some environments with no or limited gravity (e.g., lunar environment), a rotating nuclear fuel chamber 506 provides better flow of the gas and improves efficiency. In certain embodiments, integrating the drive shaft 520 with the rotating nuclear fuel chamber 506 provides rotordynamic benefits by effectively having a shorter drive shaft 520 and with the nuclear fuel chamber 506 itself effectively serving as a stiffer, larger drive shaft that is more stable and provides a damping effect against lateral and torsional vibration. In still further embodiments, integration of drive shaft 520 in the rotating nuclear fuel chamber 506 eliminates or reduces design challenges presented by radiation and high temperatures in embodiments where a drive shaft goes through the nuclear fuel chamber 506. In some embodiments, the greater rotating mass from the rotating nuclear fuel chamber 506 provides more electrical and mass inertia. In addition, in some embodiments, the rotating nuclear fuel chamber 506 has a flywheel effect, allowing for intermittent subcritical operation of the system in order to conserve nuclear fuel and permitting a smaller nuclear fuel chamber 506 and overall system. In still certain embodiments, the rotating nuclear fuel chamber 506 assures continued gas flow and cooling in the event of a shut down of the nuclear fuel chamber 506, including in the event of an accident. In certain embodiments, the drive shaft 520 is connected to two or more bearings and beams (or other support members) 560a, 560b to support the rotating nuclear fuel chamber 506, as described in this disclosure.

In particular, FIG. 5 illustrates a closed system nuclear power generation apparatus 500 comprising a containment vessel 502 housing a gas propellant chamber 526 which includes an inlet assembly 504, nuclear fuel chamber 506, and exhaust assembly 508. The containment vessel 502 also defines a circulation path 510 for the operating gas to flow in the closed system nuclear power generation apparatus 500. As shown in FIG. 5, in this embodiment, the inlet assembly 504 includes a compressor 512, such as a centrifugal compressor as illustrated in FIG. 5, disposed in the inlet port or first end of the annular body of the gas propellant chamber 526. A variety of configurations of a compressor are available and may be used without deviating from the intent of the present disclosure. For example, in some embodiments, an axial compressor, as depicted in FIG. 2, is used. The compressor 512 is connected via a drive shaft 520 to the downstream components, such as turbine assembly 518, and to upstream components, such as a circulation fan 532.

In the embodiment illustrated in FIG. 5, the inlet port of the annular body of the gas propellant chamber 526 has a cross section that decreases along the length of the inlet port where the compressor 512 is located and the embodiment further includes an exterior bypass 530, an interior bypass 540, and an exhaust assembly 508 including a nozzle 516 and a turbine assembly 518. In the embodiment illustrated in FIG. 5, the nuclear fuel chamber 506 includes interior flow paths 515 disposed in a spiral or helical configuration such that the operating gas continues traveling in a spiral path after exiting the compressor 512. In particular, the nuclear fuel chamber 506 includes interior flow paths 515 adjacent to nuclear fuel elements 514 such that the operating gas continues traveling directionally in the spiral or helical path initiated by the compressor 512. The spiral configuration of the interior flow paths 515 allows the gas to spiral through the nuclear fuel chamber 506 to keep the gas moving through the apparatus 500. Such configuration may allow the interior flow paths 515 to more evenly distribute heat to the operating gas. The spiral configuration may also allow for a shorter nuclear fuel core while maintaining a long contact path between the operating gas and the fuel core. As shown in FIG. 5, the nuclear fuel chamber 606 includes interior flow paths 515 disposed in a spiral or helical configuration. To form the spiral or helical flow paths 515, in some embodiments, the nuclear fuel chamber 506 includes fuel elements 514 with helical groves, helically shaped elements with gas passages, graphite or metal blocks with helical passages, or imbedded fuel as well as a liquid fuel tank with helical pipes following the needed flow shape. Variations on the configuration of the nuclear fuel elements 514, flow paths 515, and nuclear fuel chamber 506 may be available, such as the configurations depicted in FIGS. 1-4, without deviating from the intent of the present disclosure.

Additionally or alternatively, the nuclear fuel chamber 506 is configured to be a rotating nuclear fuel chamber 506, such that the nuclear fuel chamber 506 rotates (e.g., flywheel effect). In the embodiment illustrated in FIG. 5, the nuclear fuel chamber 506 is configured to rotate along the drive shaft 520 along with the compressor 512 and the turbine assembly 518. Such a rotating nuclear fuel chamber 506 may be beneficial, especially for space applications since the gravitational forces may be minimal. For instance, in some embodiments, the nuclear fuel chamber 506 is connected to the drive shaft 520 (e.g., at one or both ends of the nuclear fuel chamber, integrally formed with the nuclear fuel chamber, etc.) and/or turbine assembly 518 such that the nuclear fuel chamber 506 is rotationally coupled to the drive shaft 520 and/or turbine assembly 518. It is contemplated, in some embodiments, that one or more gear boxes 575, 576 are disposed near the compressor 512, such as a gear box 575 (e.g., fourth gear box 575) disposed upstream of the compressor 512 and a gear box 576 (e.g., second gear box 576) disposed upstream of the nuclear fuel chamber 506. In some embodiments, the one or more gear boxes 575, 576 are configured to allow the compressor 512 to rotate at a different rate than the rotating nuclear fuel chamber 506. In still further embodiments, a gear box 577 (e.g., first gear box 577) is disposed downstream of the nuclear fuel chamber 506 and upstream of the turbine blade array 518, the gear box 577 and gear box 576 configured to allow the rotating nuclear fuel chamber 506 to rotate at a different rate than the turbine blade assembly 518 and/or the compressor 512. Such a rotating nuclear fuel chamber embodiment may be used in a limited gravity environment such as on the lunar surface or in space travel. A rotating nuclear fuel chamber 506 may provide better flow of the gas and improve efficiency. In certain embodiments, integrating the drive shaft 520 with the rotating nuclear fuel chamber 506 provides rotordynamic benefits by effectively having a shorter drive shaft 520 and with the nuclear fuel chamber 506 itself effectively serving as a stiffer, larger drive shaft that is more stable and provides a damping effect against lateral and torsional vibration. In still further embodiments, integration of drive shaft 520 in the rotating nuclear fuel chamber 506 eliminates or reduces design challenges presented by radiation and high temperatures in embodiments where a drive shaft goes through the nuclear fuel chamber 506. In some embodiments, the greater rotating mass from the rotating nuclear fuel chamber 506 provides more electrical and mass inertia. In addition, in some embodiments, the rotating nuclear fuel chamber 506 has a flywheel effect, allowing for intermittent shut down of the nuclear fuel chamber 506 to conserve fuel and permitting a smaller nuclear fuel chamber 506 and overall system. In still certain embodiments, the rotating nuclear fuel chamber 506 assures continued gas flow and cooling in the event of a shut down of the nuclear fuel chamber 506, including in the event of an accident.

In the embodiment illustrated in FIG. 5, in order to stabilize and support the rotating drive shaft 520, one or more portions of the drive shaft 520 are supported by bearings and beams (or other support members) 560a, 560b, which are attached to the containment vessel 502. Such support member(s) 560a, 560b are disposed downstream and/or upstream of the nuclear fuel chamber 506, allowing the drive shaft 520 and, in the instance of the embodiment depicted in FIG. 5, the nuclear fuel chamber 506, to rotate.

Returning to the exhaust assembly 508, as shown in FIG. 5, in this embodiment, the exhaust assembly 508 includes a nozzle 516 and a turbine assembly 518 (e.g., a blade assembly comprising one or more turbine blades) in line with the exit of the nozzle 516. Also in the embodiment illustrated in FIG. 5, the turbine assembly 518 (e.g., the turbine assembly 518 configured to operate as a rotor) is in communication with, or otherwise within engageable proximity of, a stator belt 538 and is connected to the shaft 520 to convert kinetic energy to rotational energy and then to electricity through the rotor/stator combination 518, 538. In certain embodiments, such positioning of the turbine assembly 518 in line with the nozzle 516 and incorporation of the rotor/stator combination with the turbine assembly 518 with the nozzle 516 decreases the size of the apparatus 500 allowing for a more compact design and, additionally or alternatively, improves the efficiency of the apparatus 500 in some embodiments. The nozzle 516 forms the exhaust port or the second end of the annular body of the gas propellant chamber 526. In some embodiments, the nozzle 516 restricts the flow area of the operating gas to increase the velocity of the gas. The flow of the operating gas exiting the nuclear fuel chamber 506 drives the turbine assembly 518 thereby generating electricity through the rotor/stator combination 518, 538. The turbine assembly 518 is rotationally connected to the compressor 512 by the drive shaft 520 and is driven by the rotation of the drive shaft 520.

Variations on the configuration of the turbine assembly 518 are available and may be used without deviating from the intent of the present disclosure. For instance, in various embodiments, the blades of the turbine assembly 518 span partially, or alternatively, entirely, the inner circumference of the opening of the nozzle 516 at the point where the operating gas contacts the blades, depending on the specific configuration of the blades, the specific configuration of the apparatus and its other components and the specific gas transportation requirements of the specific apparatus configuration. In other embodiments, for example, additionally or alternatively, one or more blade arrays are positioned downstream of the nozzle 516 and such blades of the turbine assembly span partially, or alternatively entirely, the inner circumference of the containment vessel (e.g., in a closed system) at the point where the operating gas contacts the blades of the turbine assembly 518.

After the operating gas strikes the turbine assembly 518, it is dispersed into the containment vessel 502 for traveling along circulation path 510 back to the inlet assembly 504. As shown in FIG. 5, downstream of the gas propellant chamber 526, the containment vessel 502 widens allowing for a reduction in pressure and temperature in the operating gas. That is, the circulation path 510 defined by the containment vessel 502 has a first diameter and a second diameter, the second diameter being larger than the first diameter and disposed downstream of the first diameter. In particular, the significant expansion and reduction in pressure of the operating gas after it passes the turbine assembly 518 and is dispersed into the significantly greater volume of the containment vessel 502 may assist in cooling of the operating gas.

In the embodiment illustrated in FIG. 5, the containment vessel 502 includes one or more heat exchangers 535 disposed along the circulation path 510 for process heat and to efficiently cool the operating gas prior to re-entry into the inlet assembly 504. It may be beneficial to include heat exchanger(s) 535 for process or district heat in cases where the operating gas is not inert or the containment vessel 502 is a closed vessel as illustrated in FIG. 5. The heat exchanger(s) 535 may also aid in cooling the gas as it circulates. For example, in some embodiments, the extracted heat is radiated from fins attached to the space craft (e.g., a rocket or a shuttle for cis-lunar space) in which the apparatus 500 is incorporated. In the case of installation on the lunar surface, the extracted heat could be ejected by radiation panels or conduction via thermal couplings to the colder portions of the moon's surface or subsurface. Additionally or alternatively, in some embodiments, the cooling of the operating gas is augmented by heat pipe technology, such that one or more such heat pipes operating by capillary action have certain diameters for corresponding atmospheric conditions. While depicted with a heat exchanger 535 in an exemplary space environment, not all applications, space or otherwise, would need such heat exchanger(s). In some embodiments, a heat exchanger 535 is not used. Various modifications can be made without deviating from the intent of the present disclosure.

Many of the features of the embodiment of FIG. 5 are discussed with respect to the apparatus 500 being deployed in a space craft or in a lunar or space environment with limited to no gravity providing electrical power. Such exemplary use and deployment environment are non-limiting examples and various modifications and uses can be made without deviating from the intent of the present disclosure.

As described with respect to FIGS. 1-5, various and different embodiments of this disclosure are adaptable such that they are configured to provide certain functionality in various applications and/or to operate in various environments. FIG. 6 illustrates a partial section view of an open system nuclear power generation apparatus 600 in accordance with some embodiments discussed herein. The open system nuclear power generation apparatus 600 of FIG. 6, surrounded by an annular containment with two open ends through which the operating gas exhausts to the surrounding environment, allows for easier maintenance (e.g., greater access for maintenance) and an efficient design. The open system nuclear power generation apparatus 600 of FIG. 6 is configured to operate in, for example, deployment sites where the additional radiation is not considered a risk to humans, animal life, or otherwise (e.g., siting on Mars in a remote location) and/or where a radiation filtration system can be utilized. In a non-limiting exemplary example, the open system nuclear power generation apparatus 600 of FIG. 6 is configured to operate in space applications (e.g., loitering or orbiting in high altitude, or in surface applications on Mars or other planet applications) so long as the ambient atmosphere has sufficient density and adequate composition to serve as the system's operating gas.

The open system apparatus 600 depicted in FIG. 6 is designed, in certain embodiments, to be attached to or incorporated in another structure or apparatus, with shielding incorporated if needed, via bearings and beams (or other support members) 660a, 660b as described in this disclosure. In some embodiments, such other structure is, for example, a satellite or other orbiting station or a station loitering in space. In certain embodiments, the electricity generated by one or more generators 622 of the nuclear power generation apparatus 600 could be used, for example, to power high-speed communications and surveillance equipment for defensive and/or offensive measures. The nuclear power generation apparatus 600 could also generate electricity to power ion or Hall thrusters for propulsion. Additionally, due to the minimal gravity, in some embodiments, a rotating nuclear fuel chamber 606 provides better flow of the gas and improves efficiency. In certain embodiments, integrating the drive shaft 620 with the rotating nuclear fuel chamber 606 provides rotordynamic benefits by effectively having a shorter drive shaft 620 and with the nuclear fuel chamber 606 itself effectively serving as a stiffer, larger drive shaft that is more stable and provides a damping effect against lateral and torsional vibration. In still further embodiments, integration of drive shaft 620 in the rotating nuclear fuel chamber 606 eliminates or reduces design challenges presented by radiation and high temperatures in embodiments where a drive shaft goes through the nuclear fuel chamber 606. In some embodiments, the greater rotating mass from the rotating nuclear fuel chamber 606 provides more electrical and mass inertia. In addition, in some embodiments, the rotating nuclear fuel chamber 606 has a flywheel effect, allowing for intermittent shut down of the nuclear fuel chamber 606 to conserve fuel and permitting a smaller nuclear fuel chamber 606 and overall system. In still certain embodiments, the rotating nuclear fuel chamber 606 assures continued gas flow and cooling in the event of a shut down of the nuclear fuel chamber 606, including in the event of an accident.

FIG. 6 illustrates an open system nuclear power generation apparatus 600 comprising an annular containment wall 650 surrounding a gas propellant chamber 626. In the embodiment illustrated in FIG. 6, the gas propellant chamber 626 has an annular body, which includes an inlet assembly 604, a nuclear fuel chamber 606, and an exhaust assembly 608. The containment wall 650 annularly surrounds the gas propellant chamber 626, defining first and second open ends, through which the operating gas flows during operation of such an open system embodiment of the apparatus 600. As shown in FIG. 6, in this embodiment, the inlet assembly 604 includes a compressor 612, such as a centrifugal compressor as illustrated in FIG. 6, disposed in the inlet port or first end of the annular body of the gas propellant chamber 626. A variety of configurations of a compressor are available, such as the axial compressor depicted in FIG. 2, and may be used without deviating from the intent of the present disclosure. In the embodiment illustrated in FIG. 6, the inlet port of the annular body of the gas propellant chamber 626 has a cross section that decreases along the length of the inlet port where the compressor 612 is disposed. Such restriction in the cross section may help to direct the operating gas to the nuclear fuel chamber 606 and to compress the operating gas prior to entry into the nuclear fuel chamber 606.

In the embodiment illustrated in FIG. 6, the nuclear fuel chamber 606 includes interior flow paths 615 disposed in a spiral or helical configuration such that the operating gas continues traveling in a spiral path after exiting the compressor 612. In particular, the nuclear fuel chamber 606 includes interior flow paths 615 adjacent to nuclear fuel elements 614 such that the operating gas continues traveling directionally in the spiral or helical path initiated by the compressor 612. Accordingly, any loss in rotational momentum due to the flow of the operating gas changing to a straight path may be mitigated. The spiral or helical flow paths 615 may minimize drag at the inlet and/or outlet of the nuclear fuel chamber 606 while also maintaining a spiral flow to optimize the speed and angle of impact of the operating gas when striking the turbine assembly 618. FIG. 6 illustrates a section view to show the inside of the fuel core.

In the embodiment illustrated in FIG. 6, the nuclear fuel chamber 606 is configured to rotate along the drive shaft 620 along with the compressor 612 and the turbine assembly 618. Such a rotating nuclear fuel chamber 606 may be beneficial, especially for space applications since the gravitational forces may be minimal. For instance, in some embodiments, the nuclear fuel chamber 606 is connected to the drive shaft 620 (e.g., at one or both ends of the nuclear fuel chamber, integrally formed with the nuclear fuel chamber, etc.) and/or turbine assembly 618 such that the nuclear fuel chamber 606 is rotationally coupled to the drive shaft 620 and/or turbine assembly 618. It is contemplated, in some embodiments, that one or more gear boxes 675, 676 are disposed near the compressor 612, such as a gear box 675 (e.g., fourth gear box 675) disposed upstream of the compressor 612 and a gear box 676 (e.g., second gear box 676) disposed upstream of the nuclear fuel chamber 606. In some embodiments, the one or more gear boxes 675, 676 are configured to allow the compressor 612 to rotate at a different rate than the rotating nuclear fuel chamber 606. In still further embodiments, a gear box 677 (e.g., first gear box 677) is disposed downstream of the nuclear fuel chamber 606 and upstream of the turbine blade array 618, the gear box 677 and gear box 676 configured to allow the rotating nuclear fuel chamber 606 to rotate at a different rate than the turbine blade assembly 618 and/or the compressor 612. Any of the embodiments disclosed herein may include a rotating nuclear fuel chamber 606. The nuclear fuel chamber 606 may be modified as needed in other embodiments, such as to remain stationary.

In the embodiment illustrated in FIG. 6, in order to stabilize and support the rotating drive shaft 620, one or more portions of the drive shaft 620 are supported by bearings and beams (or other support members) 660a, 660b, which are attached to the containment wall 602 and/or the structure or other apparatus to which the open system embodiment is attached or incorporated, or some external environment. Such support member(s) 660a, 660b are disposed downstream and/or upstream of the nuclear fuel chamber 606, allowing the drive shaft 620 and, in the instance of the embodiment depicted in FIG. 6, the nuclear fuel chamber 606, to rotate.

Returning to the nuclear fuel chamber 606, the spiral configuration of the interior flow paths 615 allows the gas to spiral through the nuclear fuel chamber 606 to keep the gas moving through the apparatus 600. Such configuration may allow the interior flow paths 615 to more evenly distribute heat to the operating gas. The spiral configuration may also allow for a shorter nuclear fuel core while maintaining a long contact path between the operating gas and the fuel core. As shown in FIG. 6, the nuclear fuel chamber 606 includes interior flow paths 615 disposed in a spiral or helical configuration. To form the spiral or helical flow paths 615, in some embodiments, the nuclear fuel chamber 606 includes fuel elements 614 with helical groves, helically shaped elements with gas passages, graphite or metal blocks with helical passages, or imbedded fuel as well as a liquid fuel tank with helical pipes following the needed flow shape. Variations on the configuration of the nuclear fuel elements 614, flow paths 615, and nuclear fuel chamber 606 are available, such as the configurations depicted in FIGS. 1-4, and may be used without deviating from the intent of the present disclosure.

Further to the embodiment illustrated in FIG. 6, an exterior bypass 630 is disposed between the gas propellant chamber 626 and the inner surface of the containment wall 650 and an interior bypass 640 is disposed between the nuclear fuel core of the nuclear fuel chamber 606 and the inner surface of the gas propellant chamber 626. In some embodiments, the bypasses 630, 640 are enlarged and, as illustrated in the embodiment in FIG. 6, in certain embodiments, the apparatus 600 utilizes a circulation fan 632 added upstream of the compressor 612 and the bypasses 630, 640 to further direct or force the operating gas into the gas propellant chamber 626 and/or either or both of the bypasses 630, 640. In some embodiments, the bypasses 630, 640 allow for cooling of the nuclear fuel chamber 606 and thus regulation of nuclear fuel chamber 606 to avoid overheating of the nuclear power generation apparatus 600. The bypasses 630, 640 may be modified as needed to achieve this and other benefits or eliminated in certain configurations to achieve other benefits. For instance, in some open system embodiments, it may be desired to eliminate either or both of the bypasses 630, 640 if such bypasses are not necessary to facilitate the flow of the operating gas through the system or to cool the nuclear fuel chamber 606.

As shown in FIG. 6, in this embodiment, the exhaust assembly 608 includes a nozzle 616 and a turbine assembly 618 in line with the exit of the nozzle 616. Such positioning of the turbine assembly 618 in line with the nozzle 616 may decrease the size of the apparatus 600 allowing for a more compact design and may improve the efficiency of the apparatus 600 in some embodiments. The nozzle 616 forms the exhaust port or the second end of the annular body of the gas propellant chamber 626. As depicted in FIG. 6, in some embodiments, the nozzle 616 restricts the flow area of the operating gas to increase the velocity of the gas.

The flow of the operating gas exiting the nuclear fuel chamber 606 drives the turbine assembly 618. In various embodiments, magnetic bearings or other high-performance bearings are utilized to minimize the surface friction at the base of the blade assemblies (e.g., spinning blades) of the turbine assembly 618 and to maximize the angular velocity of the blades. The turbine assembly 618 is rotationally connected to the compressor 612 by the drive shaft 620 and is driven by the rotation of the drive shaft 620.

Variations on the configuration of the turbine assembly 618 are available, such as the configurations depicted in FIGS. 1, 2, and 3, and may be used without deviating from the intent of the present disclosure. For instance, in some embodiments, the blades of the turbine assembly 618 span partially, or alternatively, entirely, the inner circumference of the opening of the nozzle 616 at the point where the operating gas contacts the blades, depending on the specific configuration of the blades, the specific configuration of the apparatus 600 and its other components and the specific gas transportation requirements of the specific apparatus configuration. In other embodiments, for example, one or more blade arrays are positioned downstream of the nozzle 616 and, in some embodiments, such blades of the turbine assembly 618 span partially, or alternatively entirely, the inner circumference of the containment vessel (e.g., in a closed system) or the containment wall (e.g., in an open system) at the point where the operating gas contacts the blades of the turbine assembly.

The turbine assembly 618 is also connected to a generator 622, shown schematically, via a gear box or couplings 605 (e.g., third gear box 605). In the embodiment illustrated in FIG. 6, the compressor 612, circulation fan 632, and turbine assembly 618, rotate along a single axis, however, the generator 622 rotates along a different axis. This configuration may be desirable in certain open system embodiments, so that the generator 622 is not directly in line with the most intense flow of the operating gas (e.g., heat, velocity, and radiation) exiting the exhaust assembly 608 of the gas propellant chamber 626. However, in other embodiments, each of the components, including the generator 622, optionally rotate along a single axis, as depicted with dashed lines in FIG. 6. Additionally or alternatively, in certain embodiments, the turbine assembly 618 is configured to operate as a rotor and is in communication with, or otherwise within engageable proximity of, a stator belt like the embodiment illustrated in FIG. 7. In such embodiments, the turbine assembly with the incorporated rotor/stator combination is connected to the shaft 620 to convert kinetic energy to rotational energy and then to electricity through the rotor/stator combination.

As the operating gas exits the turbine assembly 618, the operating gas is released into the surrounding environment. As illustrated in the FIG. 6, in certain embodiments, shielding 680 surrounds the generator 622 on one or more sides to further protect the generator 622 from heat, radiation, or a combination thereof from the most intense flow of the operating gas exiting the gas propellant chamber 626. In some embodiments, the surface of the shielding 680 is configured to further divert (e.g., to at least partially divert) the flow of operating gas striking the shielding 680. For instance, in certain embodiments, the surface of the shielding 680 is angled (not shown) to further divert (e.g., to at least partially divert) the flow of operating gas.

Although not depicted, some embodiments of the open system apparatus 600 comprise an optional filtration system located upstream of the inlet assembly 604. Such a filtration system may be needed in some space application environments to filter the ambient atmosphere prior to entering the inlet assembly 604 in such an open system embodiment 604. For example, particles or other matter may need to be filtered when, for example, loitering or orbiting in the upper atmosphere or in surface applications on Mars or another planet. Still other embodiments of the open system apparatus 600 use electricity generated to power thrusters (e.g., ion thrusters) for loitering.

Some of the features of the embodiment of FIG. 6 are discussed with respect to the apparatus 600 being deployed in various space applications. Such exemplary use and deployment environment are non-limiting examples and various modifications and uses can be made without deviating from the intent of the present disclosure.

As described with respect to FIGS. 1-6, various and different embodiments of this disclosure are adaptable such that they are configured to provide certain functionality in various applications and/or to operate in various environments. FIG. 7 illustrates a partial section view of an open nuclear power generation apparatus in accordance with some embodiments discussed herein. The open system nuclear power generation apparatus 700 of FIG. 7 allows for easier maintenance (e.g., greater access for maintenance) and an efficient design. The open system nuclear power generation apparatus 700 of FIG. 7 is configured to operate in, for example, deployment sites where radiation is not considered a risk to humans, animal life, or otherwise (e.g., siting on Mars in a remote location) and/or where a radiation filtration system can be utilized. In a non-limiting exemplary example, the open system nuclear power generation apparatus 700 of FIG. 7 is configured to operate in, for instance, certain space applications where the ambient air can serve as the system's operating gas. For example, the composition of the air on Mars would be a suitable operating gas and the density of the air may be sufficient for the air to serve as the operating gas. Depending on the siting of the system, in certain embodiments, additional shielding and/or a downstream radiation filtration system are included to protect any nearby personnel (e.g., in certain surface applications on Mars or other planet applications). The compact open system apparatus 700 depicted in FIG. 7 is designed, in certain embodiments, to generate electricity via the rotor/stator belt assembly 718, 738 integrated within the turbine assembly 718 and nozzle 716, the integrated rotor/stator belt assembly 718, 738 reducing energy losses and increasing efficiency in certain embodiments.

FIG. 7 illustrates an open system nuclear power generation apparatus 700 comprising an annular containment wall 750 surrounding a gas propellant chamber 726. For instance, such an open system embodiment may be utilized in space applications (e.g., loitering or orbiting in the upper atmosphere, or in surface applications on Mars or another planet). In the embodiment illustrated in FIG. 7, the gas propellant chamber 726 has an annular body, which includes an inlet assembly 704, a nuclear fuel chamber 706, and an exhaust assembly 708. The containment wall 750 annularly surrounds the gas propellant chamber 726, defining first and second open ends, through which the operating gas flows during operation of such an open system embodiment of the apparatus 700. As shown in FIG. 7, in this embodiment, the inlet assembly 704 includes a compressor 712, such as a centrifugal compressor as illustrated in FIG. 7, disposed in the inlet port or first end of the annular body of the gas propellant chamber 726. A variety of configurations of a compressor are available, such as the axial compressor depicted in FIG. 2, and may be used without deviating from the intent of the present disclosure.

In the embodiment illustrated in FIG. 7, the inlet port of the annular body of the gas propellant chamber 726 defines a cross section that decreases along the length of the inlet port where the compressor 712 is disposed. Such restriction in the cross section may help to direct the operating gas to the nuclear fuel chamber 706 and to compress the operating gas prior to entry into the nuclear fuel chamber 706.

In the embodiment illustrated in FIG. 7, the nuclear fuel chamber 706 includes interior flow paths 715 disposed in a spiral or helical configuration such that the operating gas continues traveling in a spiral path after exiting the compressor 712. In particular, the nuclear fuel chamber 706 includes interior flow paths 715 adjacent to nuclear fuel elements 714 such that the operating gas continues traveling directionally in the spiral or helical path initiated by the compressor 712. Variations on the configuration of the nuclear fuel elements 714, flow paths 715, and nuclear fuel chamber 706 are available, such as the configurations depicted in FIGS. 1-4 and 5 (e.g., rotating nuclear fuel chamber), and may be used without deviating from the intent of the present disclosure.

Further to the embodiment illustrated in FIG. 7, an exterior bypass 730 is disposed between the gas propellant chamber 726 and the inner surface of the containment wall 750 and an interior bypass 740 is disposed between the nuclear fuel core of the nuclear fuel chamber 706 and the inner surface of the gas propellant chamber 726. In some embodiments, the bypasses 730, 740 are enlarged. In certain embodiments, as illustrated in the embodiment in FIG. 7, the apparatus utilizes a circulation fan 732 added upstream of the compressor 712 and the bypasses 730, 740 to further direct or force the operating gas into the gas propellant chamber 726 and/or either or both of the bypasses 730, 740. In some embodiments, the bypasses 730, 740 allow for cooling of the nuclear fuel chamber 706 and thus regulation of nuclear fuel chamber 706 to avoid overheating of the nuclear power generation apparatus 700. The bypasses 730, 740 may be modified as needed to achieve this and other benefits or eliminated in certain configurations to achieve other benefits. For instance, in some open system embodiments, it may be desired to eliminate either or both of the bypasses 730, 740 if such bypasses are not necessary to facilitate the flow of the operating gas through the system or to cool the nuclear fuel chamber.

As shown in FIG. 7, in this embodiment, the exhaust assembly 708 includes a nozzle 716 and a turbine assembly 718 (e.g., a blade assembly comprising one or more turbine blades) in line with the exit of the nozzle 716. Also in the embodiment illustrated in FIG. 7, the turbine assembly 718 (e.g., the turbine assembly 718 configured to operate as a rotor) is in communication with, or otherwise within engageable proximity of, a stator belt 738 and is connected to the shaft 720 to convert kinetic energy to rotational energy and then to electricity through the rotor/stator combination 718, 738. In certain embodiments, such positioning of the turbine assembly 718 in line with the nozzle 716 and incorporation of the rotor/stator combination with the turbine assembly 718 with the nozzle 716 decreases the size of the apparatus 700 allowing for a more compact design and, additionally or alternatively, improves the efficiency of the apparatus 700 in some embodiments. The nozzle 716 forms the exhaust port or the second end of the annular body of the gas propellant chamber 726. In some embodiments, the nozzle 716 restricts the flow area of the operating gas to increase the velocity of the gas. The flow of the operating gas exiting the nuclear fuel chamber 706 drives the turbine assembly 718 thereby generating electricity through the rotor/stator combination 718, 738. The turbine assembly 718 is rotationally connected to the compressor 712 by the drive shaft 720 and is driven by the rotation of the drive shaft 720.

Variations on the configuration of the turbine assembly 718 are available and may be used without deviating from the intent of the present disclosure. For instance, in various embodiments, the blades of the turbine assembly 718 span partially, or alternatively, entirely, the inner circumference of the opening of the nozzle 716 at the point where the operating gas contacts the blades, depending on the specific configuration of the blades, the specific configuration of the apparatus and its other components and the specific gas transportation requirements of the specific apparatus configuration. In other embodiments, for example, additionally or alternatively, one or more blade arrays are positioned downstream of the nozzle 716 and such blades of the turbine assembly span partially, or alternatively entirely, the inner circumference of the containment vessel (e.g., in a closed system) or the containment wall (e.g., in an open system) at the point where the operating gas contacts the blades of the turbine assembly.

Additionally or alternatively, the turbine assembly 718 is also connected to one or more generators 722, shown schematically, via one or more gear boxes or couplings 705. In the embodiment illustrated in FIG. 7, an optional generator 722, the compressor 712, circulation fan 732, and turbine assembly 718, rotate along a single axis. Additionally or alternatively, a generator 722 optionally rotates along a different axis. This configuration may be desirable in certain open system embodiments, so that the generator 722 is not directly in line with the most intense flow of the operating gas (e.g., heat, velocity, and radiation) exiting the exhaust assembly 708 of the gas propellant chamber 726.

As the operating gas exits the turbine assembly 718, the operating gas is released into the surrounding environment. As illustrated in the FIG. 7, in some embodiments, shielding 780 surrounds the generator(s) 722 on one or more sides to further protect the generator(s) 722 from heat, radiation, or a combination thereof from the most intense flow of the operating gas exiting the gas propellant chamber 726. In some embodiments, the surface of the shielding 780 is configured to further divert (e.g., to at least partially divert) the flow of operating gas striking the shielding 780. For instance, in certain embodiments, the surface of the shielding 780 is angled to further divert (e.g., to at least partially divert) the flow of operating gas.

Although not depicted, some embodiments of the open system apparatus 700 comprise an optional filtration system located upstream of the inlet assembly 704. Such a filtration system may be needed in some space application environments to filter the ambient atmosphere prior to entering the inlet assembly 704 in such an open system embodiment 704. For example, particles or other matter may need to be filtered when, for example, in surface applications on Mars or another planet. Still other embodiments of the open system apparatus 700 use electricity generated to power thrusters (e.g., ion thrusters) for loitering.

Some of the features of the embodiment of FIG. 7 are discussed with respect to the apparatus 700 being deployed in certain space applications. Such exemplary use and deployment environment are non-limiting examples and various modifications and uses can be made without deviating from the intent of the present disclosure.

Details of the partially integrated rotor/stator assembly of FIGS. 1 and 2 is provided in FIG. 8A. In particular, the rotor/stator assembly is partially integrated with the outer wall of the containment vessel 802. In the embodiment illustrated in FIG. 8A, the rotor 836 is shortened and the turbine assembly 818 is coupled to the drive shaft 820. In the depicted embodiments, the drive shaft 820 is supported by, but does not penetrate, the outer wall of the containment vessel 802. In FIG. 8A. the rotor 836 is in communication with a stator 838 by way of a high performance bearing 837, such as a magnetic bearing, which interfaces between the rotor 836 and the outer wall of the containment vessel 802. Additionally or alternatively, in some embodiments, the rotor 836 and/or drive shaft 820 is further supported and/or stabilized by supporting beams and/or other stabilizing structures. The stator 838 is connected to the containment vessel 802 and is stationary as the rotor 836 rotates with the shortened turbine assembly 818. Although not illustrated in FIG. 8A, shielding is optionally coupled to and protects the rotor 836 (e.g., the turbine assembly 818 coupled to the optional shielding) from the heat and radiation of the operating gas exiting the nozzle 816 and being dispersed from the turbine assembly 818. In certain embodiments, the wall of the containment vessel 802 is thickened, built up, or otherwise structured to support such a partially integrated rotor/stator assembly 836, 837, 838. For example, depending on the configuration of the containment vessel 802, this may include added thickness and/or lateral supports in the containment vessel 802 at and/or in the vicinity of the rotor/stator assembly 836, 837, 838.

In some embodiments, as illustrated in FIG. 8A, the surface of the containment vessel 802 is not curved or bowed at the location of the partially integrated rotor/stator assembly 836, 837, 838 to facilitate engagement of the assembly. In certain embodiments, a portion of the inner surface of the containment vessel 802 adjoining the rotor 836 and high performance bearing 837 is recessed or sunken to allow all or a portion of the rotor 836 and the high performance bearing 837 to be partially or fully recessed within the outer wall of the containment vessel 802. Additionally or alternatively, in some embodiments, the rotor 836 and/or the bearing 837 is wholly or partially surrounded by a reinforced lip incorporated in the outer wall of the containment vessel 802. Additionally or alternatively, in some embodiments, a portion of the inner surface of the containment vessel 820 adjoining the rotor 836 and high performance bearing 837 incorporates a taper shaped cone, to stabilize the drive shaft and turbine if the rotor and high performance bearing are shaped to conform and fit within the cone as depicted in FIG. 8B. In some embodiments, the taper shaped cone is truncated and still further embodiments, the taper shaped cone includes additional bearings. The stator 838 is connected to the exterior of the containment vessel 802 and is stationary as the rotor 836 rotates with the turbine assembly 818.

It is contemplated that the rotor/stator components in FIGS. 1-3 may be modified or replaced to resemble any of the components shown in the detail views of FIGS. 8, 9, 10, and 11. It is also contemplated that the rotor/stator components in FIG. 7 may be modified or replaced to resemble the components shown in the detail view of FIG. 9. For instance, as depicted in FIG. 9, a circulation fan 932 disposed proximate to the compressor (e.g., 212 in FIG. 2) and configured to draw operating gas into the compressor can be configured to operate as a rotor 936 in communication with, or otherwise within engageable proximity of, a stator belt 938 to convert kinetic energy to rotational energy and then to electricity through the rotor/stator assembly. Such configuration may reduce the size of the design by including the generator in the apparatus, may avoid penetrating the outer wall of the containment vessel wall, and may improve the efficiency of the apparatus in some embodiments.

In still other embodiments, as depicted in FIG. 10, a rotor/stator assembly 1036, 1037, 1038 is disposed at one end of the drive shaft 1020 (e.g., 320 in FIG. 3) within the containment vessel 1002, proximate to the inner surface of the containment vessel 1002, such that the rotor/stator assembly 1036, 1037, 1038 is fully integrated within the containment vessel 1002. In such embodiments, the rotor 1036 is connected (e.g., integrally formed with or fixedly coupled to) to the drive shaft 1020 extending axially through the containment vessel 1002, and the stator 1038 is also disposed within the containment vessel 1002 such that it is in communication with the rotor 1036, via a high performance bearing 1037, to convert kinetic energy to rotational energy and then to electricity through the rotor/stator assembly 1036, 1037, 1038. Although not illustrated in FIG. 10, shielding is optionally coupled to and protects the rotor 1036 from the heat and radiation of the operating gas. The rotor 1036 optionally incorporates fins or other aerodynamic fan-like structures on the surface of the rotor facing the interior of the containment vessel 1002 to facilitate gas transportation, as depicted by the dashed lines in FIG. 10.

In still other embodiments, as depicted in FIG. 11, a generator 1122 is fully integrated within a generator container 1160, the generator container 1160 being attached to the exterior of the containment vessel 1102 or otherwise forming an extension to the containment vessel 1102, the extension forming a sealed compartment separated from the flow of the operating gas in the containment vessel 1102. The generator container 1160 is filled with any suitable gas, including inert gases, such as helium. As further illustrated in FIG. 11, the drive shaft 1120 extending axially through the interior of the containment vessel 1102 extends through an aperture or opening in the exterior wall of the containment vessel 1102, to the exterior of the containment vessel 1102 and into the generator container 1160, and the generator 1122 is coupled to the drive shaft 1120. A seal 1165 is disposed at the junction of the aperture and the drive shaft 1120 to minimize or otherwise sufficiently prevent the passage or leakage of the operating gas into the generator container 1160 and/or of the gas in the generator container 1160 into the containment vessel 1120. Although not depicted in FIG. 11, in certain embodiments, it may be desired for the generator container 1160 to be further cooled via air, water, and/or a gas refrigeration system and for the containment vessel 1102 to be configured to allow access to the generator 1122 for repairs and maintenance. It is further contemplated that, additionally or alternatively, in some embodiments, one or more tanks, reservoirs, and/or containers containing operating gas are optionally associated with and/or accessible to the containment vessel 1102 and/or the generator container 1160 for replenishing and/or otherwise servicing the operating gas in the containment vessel 1102 and/or the generator container 1160. For instance, in an embodiment in which the nuclear power generation apparatus is utilized in an environment that is remote, not easily accessible, and/or inaccessible (e.g., on a submarine, in space, the upper atmosphere, other planets, etc.), such one or more tanks, reservoirs, and/or containers can be used to replenish any potential leakage or pressure variation of the operating gas.

In some embodiments, a flywheel is incorporated in the apparatus. For instance, the compressor is rotationally connected to a flywheel by a drive shaft running through the nuclear power generation apparatus. In certain embodiments, the compressor and flywheel rotate along the same axis, however, in other embodiments, the components rotate along different axes. The flywheel is positioned outside of the containment vessel in some embodiments and in other embodiments, an external flywheel is not used. A flywheel may be added to any of the embodiments disclosed here. In some embodiments, the flywheel internal to the containment vessel and in other embodiments, the flywheel is external to the containment vessel.

Various embodiments of the present apparatus provides the superior qualities of nuclear fuel (its remarkable energy per mass and its long-life) in a gas-propellant system to create an electricity generating system taking better advantage of the nuclear fuel qualities and providing a simpler, integrated design that eliminates some of the complex thermal conversion machinery and related significant energy losses from current nuclear reactor designs, as well as the risks and maintenance associated with such machinery. This apparatus also provides for the generation of mechanical and/or thermal energy in addition to electricity. The simpler, integrated design also allow for substantially greater design flexibility as well as the capability to optimize the expected electricity and other energy production through the adjustment of various design features, such as the type and configurations of the components in the apparatus (e.g., the compressor, turbine, generator, nozzles, rotor/stator belts, etc.), the arrangement of nuclear fuel element lattice and other components in the fuel core, the type of the operating gas, and the configuration of the containment vessel. By applying current technologies and methodologies through computer modeling and other analyses, substantially enhanced design specifications can be achieved in a cost-effective manner and these processes can be easily adapted to provide alternative designs for different, specific operational uses intended for various embodiments of the present apparatus.

Embodiments of the present apparatus are also an inherently safer design than that of many current nuclear reactors because it may have a lower nuclear core power density, could use an inert gas as the coolant, and eliminates all or most of the thermal conversion machinery. The apparatus is capable of being factory manufactured, which would result in lower and more predictable capital costs. The apparatus could be fueled in the factory under controlled circumstances, and then safely transported to its onsite production location, making it more proliferation resistant. Additionally, the more efficient and simpler design of the embodiments of the present disclosure may result in the use of a smaller quantity of nuclear fuel, and for a longer period of time, thus enhancing its safety features and providing advantages over other nuclear reactor designs as far as nuclear waste disposal and being proliferation resistant. The safety and simpler operations of the apparatus allows it to be sited at desalination plants, as well as adjacent to industrial and other facilities to provide such facilities process heat in addition to electrical power. These same qualities would also allow for broad deployment for the mechanical energy generated by the apparatus to be used in various applications. Further, the smaller, more compact design would reduce the difficult siting or location issues currently considered for nuclear reactors.

Various adaptations of the present apparatus utilize, with adaptions understood by those persons skilled in the art, current state-of-the-art materials and designs for advanced nuclear reactor systems, jet engines and space nuclear systems. Some embodiments of the present apparatus also generally permit advances made in advanced nuclear reactor systems, jet engine designs, and space nuclear systems to be incorporated either through the designs of future systems or by minor retrofitting of then existing reactors that use the apparatus.

Many modifications and other embodiments of the present disclosure set forth herein will come to mind to one skilled in the art to this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for generating electricity, the apparatus comprising:
   a gas propellant chamber comprised of an annular body defining first and second ends, the first end of the annular body defining an inlet assembly that is structured to draw operating gas into the gas propellant chamber and the second end defining an exhaust assembly that is structured to expel the operating gas from the gas propellant chamber, wherein the inlet assembly comprises a compressor and the exhaust assembly comprises a turbine assembly;
   a rotating nuclear fuel core positioned within the annular body of the gas propellant chamber between the compressor and the turbine assembly, a first shaft extending from a first end of the rotating nuclear fuel core to a first gear box, wherein the first gear box is positioned downstream of the rotating nuclear fuel core, and a second shaft extending from a second end of the rotating nuclear fuel core to a second gear box, wherein the second gear box is positioned upstream of the rotating nuclear fuel core; and
   a generator communicably connected to the rotating nuclear fuel core, the generator structured to generate electricity.

2. The apparatus of claim 1, wherein the first and second shafts do not extend through the rotating nuclear fuel core.

3. The apparatus of claim 2, wherein the first and second gear boxes are structured to allow the rotating nuclear fuel core to rotate.

4. The apparatus of claim 1, further comprising:
   a third gear box, wherein the first gear box is connected to the third gear box via the first shaft and the turbine assembly is positioned between the first and third gear boxes.

5. The apparatus of claim 4, wherein the generator is connected to the third gear box, the generator rotating along a different axis than the first shaft.

6. The apparatus of claim 4, wherein the first and third gear boxes are structured to allow the turbine assembly to rotate at a different rate than the rotating nuclear fuel core.

7. The apparatus of claim 4, wherein a flywheel is connected to the third gear box, the flywheel structured to rotate along a different axis than the compressor.

8. The apparatus of claim 1, further comprising:
   a fourth gear box, wherein the second gear box is connected to the fourth gear box via the second shaft and the compressor is positioned between the second and fourth gear boxes.

9. The apparatus of claim 8, wherein the second and fourth gear boxes are structured to allow the compressor to rotate at a different rate than the rotating nuclear fuel core.

10. The apparatus of claim 1, further comprising:
    a containment vessel, wherein the gas propellant chamber is disposed within the containment vessel.

11. The apparatus of claim 10, wherein the first shaft further extends to at least a first end of the containment vessel.

12. The apparatus of claim 1, wherein the exhaust assembly further comprises a nozzle, the nozzle structured to restrict a flow area of the operating gas exiting the rotating nuclear fuel core.

13. The apparatus of claim 12, wherein the turbine assembly is disposed in line with an exit of the nozzle.

14. The apparatus of claim 13, wherein the generator comprises a rotor/stator belt assembly integrated within the turbine assembly and the nozzle.

15. The apparatus of claim 1, further comprising at least a first support member disposed upstream of the rotating nuclear fuel core and a second support member disposed downstream of the rotating nuclear fuel core.

16. The apparatus of claim 15, wherein the first shaft extends to and is supported by the second support member.

17. The apparatus of claim 16,
wherein the second shaft extends to and is supported by the first support member.

18. The apparatus of claim 17, further comprising:
    an annular containment wall annularly surrounding the gas propellant chamber, the annular containment wall defining a first open end proximate the first end of the gas propellant chamber and a second open end proximate the second end of the gas propellant chamber.

19. The apparatus of claim 18, wherein each of the first support member and the second support member is attached to the annular containment wall.

20. The apparatus of claim 17, further comprising:
a containment vessel, wherein the gas propellant chamber is disposed within the containment vessel and wherein each of the first support member and the second support member is attached to the containment vessel.

* * * * *